(12) United States Patent
Kokubo et al.

(10) Patent No.: US 7,878,605 B2
(45) Date of Patent: Feb. 1, 2011

(54) BRAKE CONTROL APPARATUS FOR VEHICLE

(75) Inventors: Koichi Kokubo, Nagoya (JP); Masahiro Matsuura, Chiryu (JP); Shigeru Saito, Kariya (JP); Yuji Sengoku, Aichi-gun (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1139 days.

(21) Appl. No.: 11/484,713

(22) Filed: Jul. 12, 2006

(65) Prior Publication Data

US 2007/0018499 A1 Jan. 25, 2007

(30) Foreign Application Priority Data

Jul. 25, 2005 (JP) ............................. 2005-214840

(51) Int. Cl.
  *B60T 8/64* (2006.01)
(52) U.S. Cl. ...................... 303/151; 303/152; 303/9.62
(58) Field of Classification Search ................ 303/151, 303/152, 9.62
  See application file for complete search history.

(56) References Cited

U.S. PATENT DOCUMENTS

2002/0180266 A1* 12/2002 Hara et al. ................. 303/152
2003/0062770 A1   4/2003 Sasaki et al.
2004/0212245 A1* 10/2004 Tsunehara et al. ............. 303/3

FOREIGN PATENT DOCUMENTS

JP   5-161212 A   6/1993
JP   2003-174703   6/2003

OTHER PUBLICATIONS

Japanese Office Action dated Sep. 29, 2010 issued in the corresponding Japanese application, with partial English-language translation.

* cited by examiner

*Primary Examiner*—Bradley T King
(74) *Attorney, Agent, or Firm*—Buchanan Ingersoll & Rooney PC

(57) ABSTRACT

A brake apparatus for a vehicle generally sets an upper limit value of regenerative braking force to the maximum value of the regenerative braking force which can be generated at the present. In the case of a front-wheel-drive vehicle, the total braking force, the sum of front-wheel braking force (front-wheel hydraulic braking force+regenerative braking force) and rear-wheel braking force (rear-wheel hydraulic braking force), is rendered coincident with a target braking force corresponding to a brake pedal depressing force, and the regenerative braking force is set to a largest possible value equal to or less than the upper limit value. As a result, the regenerative braking force can be larger than front-wheel-side target distribution braking force. The upper limit value is decreased from the maximum value by an amount corresponding to the degree of easiness of occurrence of a locking tendency at the driven wheels (front wheels).

11 Claims, 8 Drawing Sheets

BRAKE CONTROL APPARATUS FOR VEHICLE

BACKGROUND OF THE INVENTION

1. Field of the Invention

The present invention relates to a brake control apparatus for a vehicle.

2. Description of the Related Art

Recently, there has been developed a brake control technique which is applied to a motor-driven vehicle using a motor as a power source for driving driven wheels or to a so-called hybrid vehicle using a motor and an internal combustion engine and which performs regeneration-coordinative brake control using braking force on the basis of hydraulic pressure (hydraulic braking force; frictional braking force) as well as regenerative braking force generated by the motor.

A brake apparatus for a vehicle which performs the above-described regeneration-coordinative brake control is generally designed to adjust the regenerative braking force and the hydraulic braking force in such a manner that the total braking force (entire braking force acting on the vehicle), which is the sum of regenerative braking force acting on driven wheels (e.g., front wheels) and hydraulic braking force (specifically, hydraulic braking force acting on the driven wheels and hydraulic braking force acting on non-driven wheels (e.g., rear wheels)) coincides with a target braking force determined on the basis of an operation input applied to a brake pedal (brake pedal depressing force or the like). See, for example, Japanese Patent Application Laid-Open (kokai) No. 2003-174703. By virtue of the adjustment, the characteristic of the total braking force with respect to the operation input acting on the brake pedal coincides with the target characteristic; therefore, a driver does not experience an unnatural sensation during braking operation.

Moreover, such a brake apparatus for a vehicle is designed to adjust the regenerative braking force and the hydraulic braking force in such a manner that the distribution of braking force between the front wheels and the rear wheels (hereinafter called the "front-rear braking force distribution") basically coincides with a predetermined target distribution (e.g., a so-called ideal braking force distribution), and that the proportion of the regenerative braking force becomes as large as possible. This operation stabilizes the behavior of the vehicle during braking, and enables more efficient collection, to a battery, of electrical energy generated by a motor during generation of the regenerative braking force.

In particular, in the brake apparatus for a vehicle described in the publication, higher priority is placed on electrical energy collection efficiency than on the front-wheel braking force distribution. Therefore, the brake apparatus is designed in such a manner that it adjusts the regenerative braking force such that the regenerative braking force becomes greater than a braking force acting on the driven wheels when the target braking force is distributed in accordance with the target distribution (ideal braking force distribution) (hereinafter, such braking force acting on the driven wheels will be referred to as the "driven-wheel-side target distribution braking force").

However, increasing the regenerative braking force, while placing higher priority on electrical energy collection efficiency than on the front-wheel braking force distribution, means that the driven wheels become more likely to lock. In view of this, the brake apparatus for a vehicle described in the publication is designed such that when a tendency of the driven wheels to lock (e.g., a state in which a slippage in the deceleration direction exceeds a predetermined degree) occurs in the case where the regenerative braking force is adjusted to be greater than the driven-wheel-side target distribution braking force, the brake apparatus decreases the regenerative braking force (and increases the proportion of the hydraulic braking force acting on the non-driven wheels) by an amount corresponding to the degree of the locking tendency, to thereby render the front-rear braking force distribution close to the target distribution.

Incidentally, control of the regenerative braking force is achieved by means of controlling AC power generated by the motor functioning as a generator; and, in general, quickly increasing and decreasing the magnitude of the regenerative braking force is difficult. Accordingly, even when an instruction for decreasing the regenerative braking force is issued upon detection of a locking tendency of the driven wheels, the regenerative braking force does not decrease quickly to a target value. As a result, the driven wheels may lock before the regenerative braking force decreases to the target value.

SUMMARY OF THE INVENTION

The present invention has been accomplished in order to cope with the above-described drawback, and an object of the present invention is to provide a brake control apparatus for a vehicle which performs regeneration-coordinative brake control using frictional braking force, such as hydraulic braking force, and regenerative braking force; which enables highly efficient collection of electrical energy; and which can suppress occurrence of driven-wheel locking which would otherwise occur due to regenerative braking force.

A brake apparatus for a vehicle to which the brake control apparatus for a vehicle according to the present invention is applied is used in a vehicle (a motor-driven vehicle, a hybrid vehicle, etc.) which includes at least a motor as a power source and in which front wheels or rear wheels are driven wheels which are driven by the motor, and the remaining wheels are non-driven wheels which are not driven by the motor.

The brake apparatus for a vehicle includes first control means (frictional-braking-force control means) for controlling respective frictional braking forces acting on the wheels, independently of a braking operation by a driver; and second control means (regenerative-braking-force control means) for controlling regenerative braking force which is generated by the motor and acts on the driven wheels.

The "frictional braking force acting on each wheel" controlled by the frictional-braking-force control means refers to frictional force which is generated on a rotary member (e.g., a disc rotor) rotating together with the wheel and brakes the wheel, when a friction member (e.g., a set of brake pads) is pressed against the rotary member. Examples of the frictional braking force include hydraulic braking force in the case where hydraulic pressure within a wheel cylinder is used as a drive source for the above-mentioned friction member, and pneumatic braking force in the case where air pressure is used as a drive source for the above-mentioned friction member. In the case where the hydraulic braking force is employed as the frictional braking force, the frictional-braking-force control means generally includes a hydraulic pump for generating a hydraulic pressure higher than hydraulic pressure (master cylinder hydraulic pressure) corresponding to operation of the brake operation member, and a plurality of solenoid valves or the like for adjusting the respective wheel-cylinder hydraulic pressures of the wheels. The pump and valves are an example of the first control means for controlling respective frictional forces acting on the wheels.

The regenerative-braking-force control means includes an inverter or the like which controls AC power supplied to, for example, an AC synchronous motor serving as a power source of the vehicle (accordingly, controls drive torque of the motor) and controls AC power generated by the motor when operating as a generator (accordingly, controls resistance produced upon generation of electrical power (hereinafter referred to as "power generation resistance"); i.e., regenerative braking force). The inverter is an example of the second control means for controlling regenerative braking force which acts on the driven wheels.

A first brake control apparatus for a vehicle according to the present invention comprises determination means (target-braking-force determination means) for determining a first target braking force, which is a target value of total braking force applied to the vehicle, on the basis of an operation input applied to the brake operation member; and adjustment means (regeneration-coordinative brake control means) for adjusting the regenerative braking force and the frictional braking force through control of the regenerative-braking-force control means and the frictional-braking-force control means such that the total braking force, which is the sum of the frictional braking force and the regenerative braking force, coincides with the first target braking force and that the regenerative braking force can become greater than the above-mentioned driven-wheel-side target distribution braking force (second target braking force).

By virtue of this configuration, as described above, the characteristic of the total braking force with respect to the operation input acting on the braking operation member coincides with the target characteristic; therefore, the driver does not experience an unnatural sensation during braking operation. Moreover, in a case where higher priority is placed on efficient collection of electrical energy than on front-rear braking force distribution, a high electrical energy collection efficiency can be achieved.

The first brake control apparatus for a vehicle according to the present invention is characterized by comprising acquisition means for acquiring a value of a factor influencing the easiness of occurrence of a locking tendency of the driven wheels when the driven wheel have no locking tendency; and change means (regenerative-braking-force proportion changing means), when the regenerative braking force is adjusted to be greater than the driven-wheel-side target distribution braking force, for changing an amount by which the regenerative braking force becomes greater than the driven-wheel-side target distribution braking force in accordance with the obtained value of the factor.

As will be described later, examples of the "factor influencing the easiness of occurrence of a locking tendency of the driven wheels" include lateral acceleration of the vehicle, vehicle body lateral direction limit index value, road surface friction coefficient, and road surface gradient. The term "locking tendency" refers to, for example, a state in which slippage in the deceleration direction exceeds a predetermined value.

With this configuration, in the case where the regenerative braking force is adjusted to be greater than the driven-wheel-side target distribution braking force, the proportion of the regenerative braking force can be changed in accordance with the easiness of occurrence of a locking tendency of the driven wheels from a stage in which a locking tendency of the driven wheels has not yet occurred.

Accordingly, in an early stage before detection of a locking tendency of the driven wheels, the front-rear braking force distribution can be made close to the target distribution by means of, for example, issuing an instruction for decreasing the regenerative braking force by an amount corresponding to the degree of easiness of occurrence of a locking tendency of the driven wheels (an instruction for increasing the proportion of the frictional braking force acting on the non-driven wheels). As a result, at a point in time when a locking tendency of the driven wheels is detected, the regenerative braking force has already been decreased sufficiently, so that the occurrence of locking of the driven wheels, which would otherwise occur at a later time because of the regenerative braking force, can be suppressed.

A second brake control apparatus for a vehicle according to the present invention comprises target-braking-force determination means, which is identical with the target-braking-force determination means of the above-described first brake control apparatus for a vehicle; limit-regenerative-braking-force acquisition means for acquiring a limit regenerative braking force, which is a upper limit value of the regenerative braking force (less than an allowable maximum regenerative braking force); and regeneration-coordinative brake control means which is adapted to adjust the regenerative braking force and the frictional braking force through control of the regenerative-braking-force control means and the frictional-braking-force control means and which has the following configuration.

In a case where the first target braking force is equal to or lower than the limit regenerative braking force (hereinafter, called "the case of a first mode"), the regenerative braking force is set to the value of the first target braking force; and the frictional braking force acting on the driven wheels and that acting on the non-driven wheels are set to zero.

In a case where the first target braking force is greater than the limit regenerative braking force and the driven-wheel-side target distribution braking force is equal to or less than the limit regenerative braking force (hereinafter, called "the case of a second mode"), the regenerative braking force is set to the value of the limit regenerative braking force; the frictional braking force acting on the non-driven wheels is set to a value obtained by subtracting the limit regenerative braking force from the first target braking force; and the frictional braking force acting on the driven wheels is set to zero.

In a case where the driven-wheel-side target distribution braking force is in excess of the limit regenerative braking force (hereinafter, called "the case of a third mode"), the regenerative braking force is set to the value of the limit regenerative braking force; the frictional braking force acting on the non-driven wheels is set to the value of a non-driven-wheel-side target distribution braking force (third target braking force), which is a braking force acting on the non-driven wheels when the first target braking force is distributed in accordance with the target distribution; and the frictional braking force acting on the driven wheels is set to a value obtained by subtracting the limit regenerative braking force from the driven-wheel-side target distribution braking force.

By virtue of the above, as in the case of the first brake control apparatus for a vehicle, the total braking force (the sum of regenerative braking force and frictional braking force) coincides with the first target braking force in each of the first to third modes; therefore, the driver does not experience an unnatural sensation during braking operation.

The cases of the first and second modes correspond to the above-described "case where the regenerative braking force is adjusted to be greater than the driven-wheel-side target distribution braking force," and the regenerative braking force can be set to the highest possible value in these modes. Accordingly, the highest priority is placed on the efficient collection of electrical energy, whereby the electrical energy collection efficiency can be increased to a possible degree.

Notably, in the first and second modes, the front-rear braking force distribution is set such that the proportion of the driven-wheel side braking force becomes greater than that in the case of the target distribution; and in the third mode, the front-rear braking force distribution is set such that the proportion of the driven-wheel side braking force becomes equal to that in the case of the target distribution.

The second brake control apparatus for a vehicle according to the present invention is characterized by comprising acquisition means which is identical with the acquisition means of the first brake control apparatus for a vehicle; and regenerative-braking-force proportion changing means for changing the limit regenerative braking force in accordance with the obtained value of the factor. In this case, specifically, the limit regenerative braking force is changed in accordance with the obtained value of the factor, within a range equal to or less than an "allowable maximum regenerative braking force," which is the maximum value of the regenerative braking force that can be generated at the present point in time.

With this configuration, the limit regenerative braking force can be changed in accordance with the easiness of occurrence of a locking tendency of the driven wheels from a stage in which a locking tendency of the driven wheels has not yet occurred. Here, decreasing the limit regenerative braking force in the first and second modes means decreasing the proportion of the regenerative force and increasing the proportion of the frictional braking force acting on the non-driven wheels.

Accordingly, in the case of the first and second modes, in an early stage before detection of a locking tendency of the driven wheels, the front-rear braking force distribution can be made close to the target distribution by means of, for example, decreasing the limit regenerative braking force by an amount corresponding to the degree of easiness of occurrence of a locking tendency of the driven wheels. As a result, as in the case of the first brake control apparatus of the present invention, the occurrence of locking of the driven wheels, which would otherwise occur at a later time because of the regenerative braking force, can be suppressed.

In the second brake control apparatus of the present invention, preferably, the acquisition means acquires a lateral acceleration of the vehicle as the factor influencing the easiness of occurrence of a locking tendency of the driven wheels; and the regenerative-braking-force proportion changing means determines the limit regenerative braking force such that the larger the acquired lateral acceleration, the smaller the limit regenerative braking force.

When a lateral acceleration is generated in the vehicle during turning, the load (vertical load) acting on the wheels located on the inner side of a turning locus decreases by an amount corresponding to the lateral acceleration. Accordingly, the greater the lateral acceleration, the greater the easiness of occurrence of a locking tendency of the inner wheels. In other words, the lateral acceleration of the vehicle can be the "factor influencing the easiness of occurrence of a locking tendency of the driven wheels in the case where the driven wheels have no locking tendency."

The above-described configuration is based on such finding. By virtue of the above-described configuration, the greater the lateral acceleration, the greater the degree to which the proportion of the regenerative braking force can be decreased. Therefore, even when the lateral acceleration of the vehicle is large, the occurrence of locking of the driven wheel located on the inner side of a turning locus, which locking would otherwise occur at a later time because of the regenerative braking force, can be suppressed without fail, and when the lateral acceleration of the vehicle is small, the electrical energy collection efficiency can be increased. Notably, the lateral acceleration may be detected by use of a lateral acceleration sensor or estimated on the basis of traveling conditions of the vehicle and by making use of a vehicle model.

In the second brake control apparatus of the present invention, preferably, the acquisition means acquires a vehicle body lateral direction limit index value as the factor influencing the easiness of occurrence of a locking tendency of the driven wheels, wherein the vehicle body lateral direction limit index value represents a degree to which turning conditions of the vehicle approach the limit of the vehicle; and the regenerative-braking-force proportion changing means determines the limit regenerative braking force such that the larger the acquired vehicle body lateral direction limit index value, the smaller the limit regenerative braking force.

Examples of the vehicle body lateral direction limit index value include the difference between an actual steering angle of the steerable wheels of the vehicle and an estimated steering angle of the steerable wheels estimated on the basis of traveling conditions of the vehicle and by making use of a predetermined vehicle model, the difference between an actual yaw rate of the vehicle and an estimated yaw rate of the vehicle estimated on the basis of traveling conditions of the vehicle and by making use of a predetermined vehicle model, and the difference between an actual lateral acceleration of the vehicle and an estimated lateral acceleration of the vehicle estimated on the basis of traveling conditions of the vehicle and by making use of a predetermined vehicle model.

A larger vehicle body lateral direction limit index value means a greater tendency of skid of the vehicle. Accordingly, the greater the vehicle body lateral direction limit index value, the greater the easiness of occurrence of a locking tendency of the wheels (particularly, the wheels on the inner side of a turning locus). In other words, the vehicle body lateral direction limit index value can be the "factor influencing the easiness of occurrence of a locking tendency of the driven wheels in the case where the driven wheels have no locking tendency."

The above-described configuration is based on such finding. By virtue of the above-described configuration, the greater the vehicle body lateral direction limit index value, the greater the degree to which the proportion of the regenerative braking force can be decreased. Therefore, even when the vehicle body lateral direction limit index value is large, the occurrence of mocking of the driven wheels (particularly, the driven wheel located on the inner side of a turning locus), which locking would otherwise occur at a later time because of the regenerative braking force, can be suppressed without fail, and when the vehicle body lateral direction limit index value is small, the electrical energy collection efficiency can be increased.

In the second brake control apparatus of the present invention, preferably, the acquisition means acquires a road surface friction coefficient as the factor influencing the easiness of occurrence of a locking tendency of the driven wheels, wherein the road surface friction coefficient represents a coefficient of friction between a road surface on which the vehicle is traveling and tires of the vehicle; and the regenerative-braking-force proportion changing means determines the limit regenerative braking force such that the larger the acquired road surface friction coefficient, the smaller the limit regenerative braking force.

The smaller the road surface friction coefficient, the greater the easiness of occurrence of a locking tendency of the wheels. In other words, the road surface friction coefficient can be the "factor influencing the easiness of occurrence of a locking tendency of the driven wheels in the case where the driven wheels have no locking tendency."

The above-described configuration is based on such a finding. By virtue of the above-described configuration, the smaller the road surface friction coefficient, the greater the degree to which the proportion of the regenerative braking force can be decreased. Therefore, even when the road surface friction coefficient is small, the occurrence of locking of the driven wheels, which locking would otherwise occur at a later time because of the regenerative braking force, can be suppressed without fail, and when the road surface friction coefficient is large, the electrical energy collection efficiency can be increased. Notably, the road surface friction coefficient can be acquired by making use of an image of a road surface obtained from a photographing means (CCD camera or the like) which photographs the road surface on which the vehicle travels, or information regarding the road surface friction coefficient obtained through road-to-vehicle communications.

In the second brake control apparatus of the present invention, preferably, the acquisition means acquires a road surface gradient as the factor influencing the easiness of occurrence of a locking tendency of the driven wheels, wherein the road surface gradient represents a gradient of a road surface on which the vehicle is traveling with respect to the front-rear direction of the vehicle body; and the regenerative-braking-force proportion changing means determines the limit regenerative braking force such that the larger the road surface gradient in a direction in which the load (vertical load) of the driven wheels decreases, the smaller the limit regenerative braking force. The "road surface gradient in a direction in which the load of the driven wheels decreases" refers to a road surface gradient of an uphill road in the case of a front-wheel-drive vehicle, and a road surface gradient of a downhill road in the case of a rear-wheel-drive vehicle.

The greater the road surface gradient in a direction in which the load of the driven wheels decreases, the greater the degree to which the load of the driven wheels decreases, and the greater the easiness of occurrence of a locking tendency of the wheels. In other words, the road surface gradient can be the "factor influencing the easiness of occurrence of a locking tendency of the driven wheels in the case where the driven wheels have no locking tendency."

The above-described configuration is based on such a finding. By virtue of the above-described configuration, the greater the road surface gradient in a direction in which the load of the driven wheels decreases, the greater the degree to which the proportion of the regenerative braking force can be decreased. Therefore, even when the road surface gradient is large, the occurrence of locking of the driven wheels, which locking would otherwise occur at a later time because of the regenerative braking force, can be suppressed without fail, and when the road surface gradient is small, the electrical energy collection efficiency can be increased. Notably, the road surface gradient can be acquired by making use of, for example, information regarding the road surface gradient obtained through road-to-vehicle communications, GPS, or the like, or the difference between an acceleration in the front-rear direction of the vehicle body detected by an acceleration sensor and an estimated acceleration in the front-rear direction of the vehicle body calculated from outputs of wheel speed sensors.

In the first and second brake control apparatuses of the present invention, preferably, the regeneration-coordinative brake control means uses, as the target distribution, a distribution determined such that the proportion of the braking force acting on the front wheels becomes larger than that in the case of an ideal braking force distribution in which locking tendencies simultaneously occur at all the wheels of the vehicle.

By virtue of this configuration, when the wheels lock during braking, locking of the front wheels always occurs prior to locking of the rear wheels. Accordingly, it is possible to suppress spinout of the vehicle, which would otherwise occur because of occurrence of locking of the rear wheels prior to locking of the front wheels.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

A brake apparatus (brake control apparatus) for a vehicle according to an embodiment of the present invention will be described with reference to the drawings.

Figure 1:
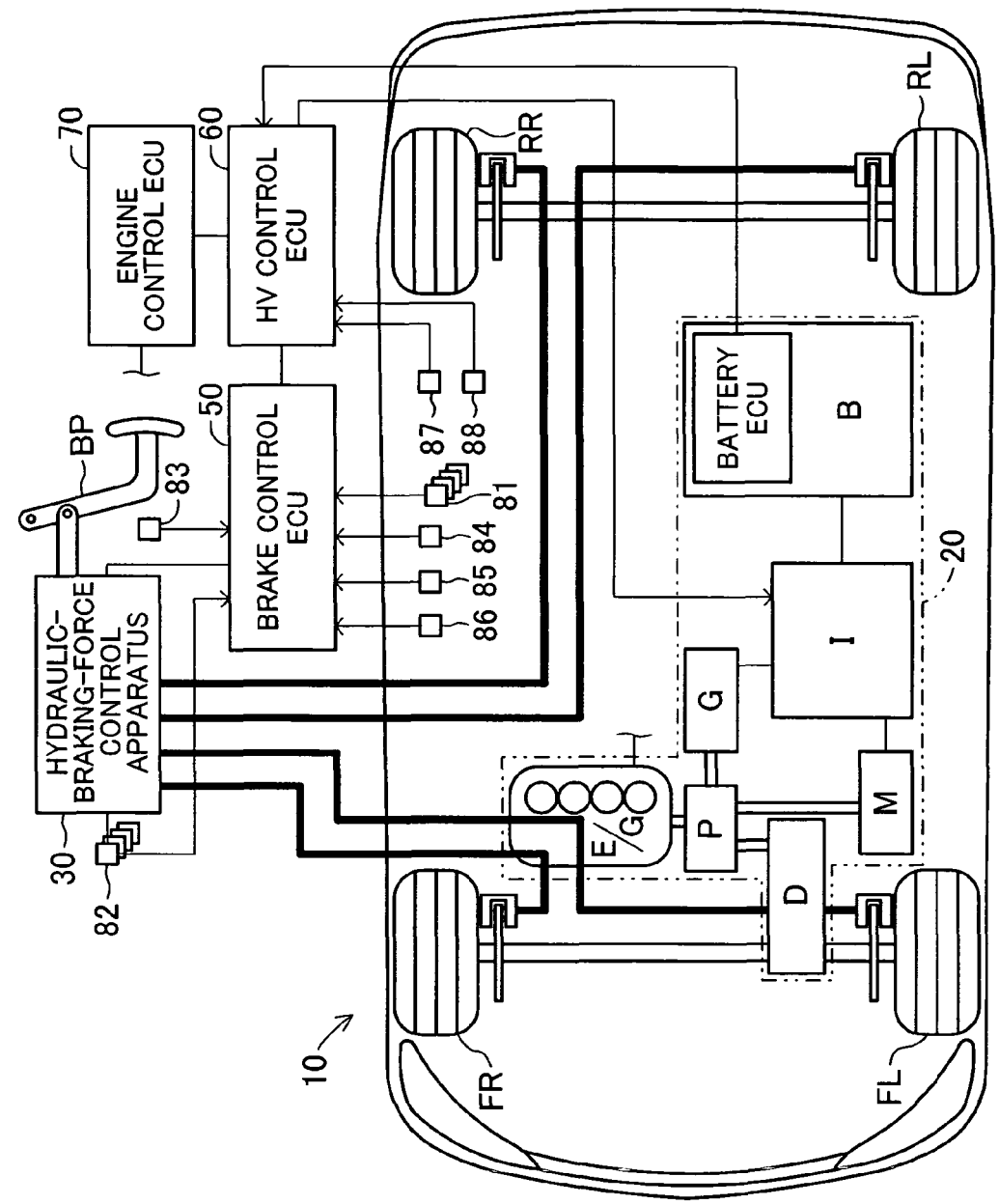
FIG. 1 is a schematic diagram of a vehicle (front-wheel-drive vehicle) equipped with a brake apparatus for a vehicle according to an embodiment of the present invention.

FIG. 1 schematically shows the structure of a vehicle equipped with a brake apparatus 10 according to the embodiment of the present invention. The illustrated vehicle is a so-called hybrid vehicle of a front-wheel drive type which uses an engine and a motor as a drive source for driving the front wheels and which includes two brake hydraulic circuits (that is, front-rear piping system); i.e., a system for the two front wheels and a system for the two rear wheels.

This brake apparatus 10 includes a hybrid system 20 having two types of power sources; i.e., an engine E/G and a motor M; a hydraulic-braking-force control apparatus 30 which controls hydraulic braking forces (specifically, wheel-cylinder hydraulic pressures) acting on the wheels; a brake control ECU 50; a hybrid control ECU (hereinafter called "HV control ECU") 60; and an engine control ECU 70.

The hybrid system 20 includes the engine E/G, the motor M, a generator G, a power division mechanism P, a reduction unit D, an inverter 1, and a battery B. The engine E/G is the main power source of the vehicle, and in the present embodiment is a spark-ignition, multi-cylinder (four-cylinder) internal combustion engine.

The motor M is an auxiliary power source of the engine E/G, and is an AC synchronous motor which also serves a generator for generating regenerative braking force when the driver operates a brake pedal BP. The generator G is an AC synchronous motor as in the case of the motor M. The generator G is driven by the engine E/G, and generates AC power (AC current) for charging of the battery B or drive of the motor M.

The power division mechanism P is formed of a so-called planetary gear mechanism and is connected to the engine E/G, the motor M, the generator G, and the reduction unit D. The power division mechanism P switches the power transmission path (and direction). That is, the power division mechanism P can transmit the drive torque of the engine E/G and the drive torque of the motor M to the reduction unit D. Thus, these drive torques are transmitted to the front wheels via the reduction unit D and an unillustrated front-wheel-side power transmission system, whereby the front wheels are driven.

Further, the power division mechanism P can transmit the drive torque of the engine E/G to the generator G, whereby the generator G is driven. Moreover, when the brake pedal BP is being operated, the power division mechanism P can transmit power from the reduction unit D (that is, the front wheels (driven wheels)) to the motor M. Thus, the motor M is driven to function as a generator for generating regenerative braking force.

The inverter I is connected to the motor M, the generator G, and the battery B. The inverter I receives DC power (high voltage DC current) supplied from the battery B, converts it to AC power (AC current) for motor drive, and supplies the AC power to the motor M. Thus, the motor M is driven. Further, the inverter I receives AC power generated by the generator G, converts it to AC power for motor drive, and supplies the AC power to the motor M. With this operation as well, the motor M is driven.

Furthermore, the inverter I can convert the AC power generated by the generator G to DC power, and supply the DC power to the battery B. With this operation, the battery B can be charged when the value of a parameter indicating the state of charge (hereinafter called "SOC") of the battery B is low.

Moreover, the inverter I can receive AC power generated by the motor M which is driven as a generator (which is generating regenerative braking force) upon operation of the brake pedal BP, convert it to DC power, and supply the DC power to the battery B. With this operation, kinetic energy of the vehicle can be converted to electric energy, and this electric energy can be collected (charged) in the battery B. In this case, the greater the power generation resistance (regenerative braking force) produced by the motor M, the greater the amount of power to be charged into the battery B.

Figure 2:
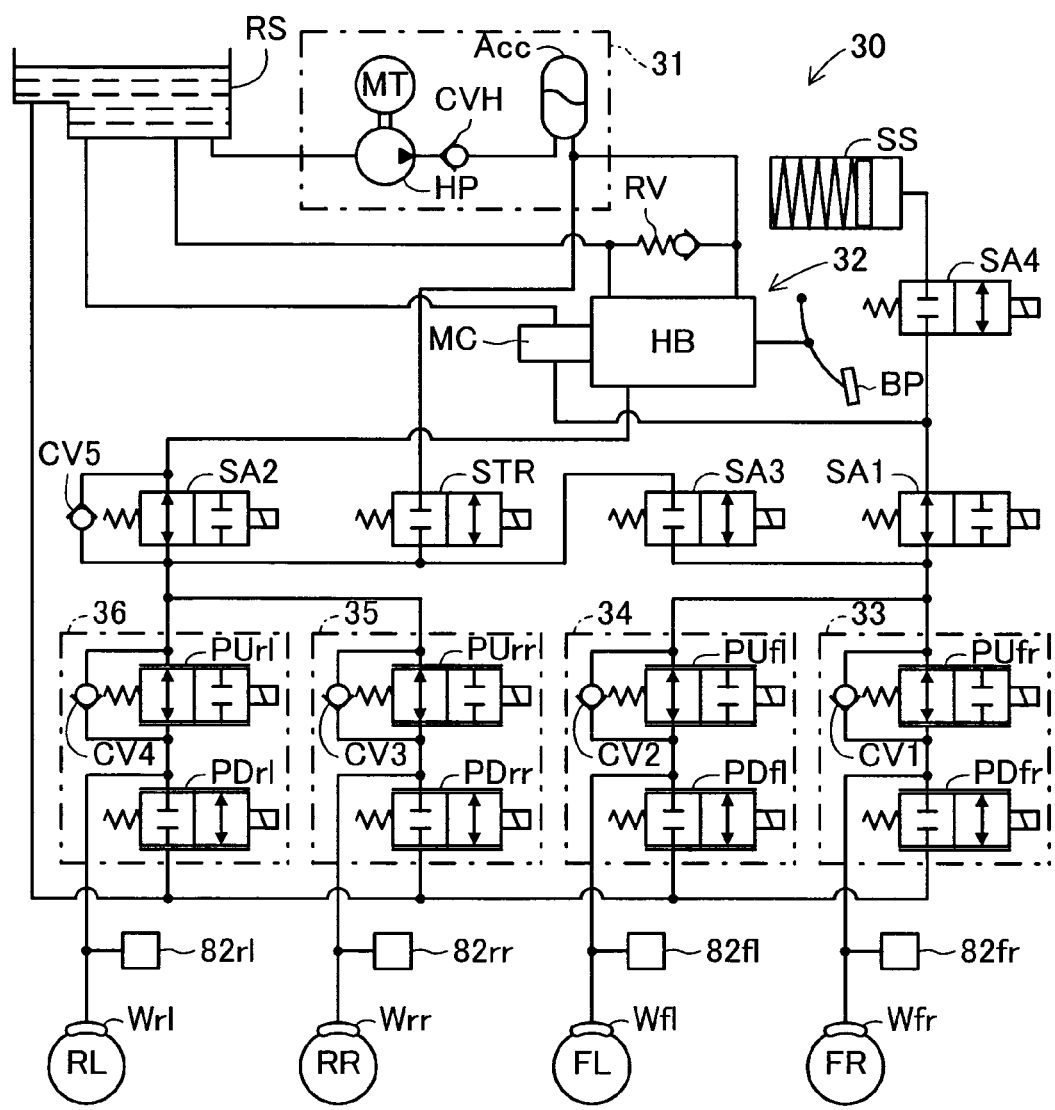
FIG. 2 is a schematic diagram of the hydraulic braking force control apparatus shown in FIG. 1.

As schematically shown in FIG. 2, the hydraulic-braking-force control apparatus 30 includes a high-pressure generation section 31; a brake hydraulic pressure generation section 32 which generates brake hydraulic pressures corresponding to the operating force of the brake pedal BP; and an FR brake hydraulic pressure adjusting section 33, an FL brake hydraulic pressure adjusting section 34, an RR brake hydraulic pressure adjusting section 35, and an RL brake hydraulic pressure adjusting section 36, which can adjust the brake hydraulic pressures supplied to corresponding wheel cylinders Wfr, Wfl, Wrr, and Wrl respectively installed on the wheels FR, FL, RR, and RL.

The high-pressure generation section 31 includes a motor MT; a hydraulic pump HP, which is driven by the motor MT so as to suck the brake fluid from a reservoir RS and discharge the sucked brake fluid while increasing the pressure; and an accumulator Acc which is connected to the discharge side of the hydraulic pump HP via a check valve CVH and stores the brake fluid pressurized by the hydraulic pump HP.

The motor MT is driven when the hydraulic pressure in the accumulator Acc falls below a predetermined lower limit value and stopped when the hydraulic pressure exceeds a predetermined upper limit value. With this operation, the hydraulic pressure in the accumulator Acc is adjusted to any pressure value (high pressure) in the range between the lower and upper limit values.

Further, a relief valve RV is disposed between the accumulator Acc and the reservoir RS. When the hydraulic pressure in the accumulator Acc becomes abnormally high beyond the upper limit value, the brake fluid in the accumulator Acc is returned to the reservoir RS. This operation protects a hydraulic circuit of the high-pressure generation section 31.

The brake hydraulic pressure generation section 32 includes a hydro booster HB which operates in response to operation of the brake pedal BP, and a master cylinder MC which is linked to the hydro booster HB. The hydro booster HB utilizes the hydraulic pressure in the accumulator Acc, which is adjusted to high pressure and is supplied from the high-pressure generation section 31, so as to boost the operating force of the brake pedal BP by a prescribed ratio and transmits the boosted operating force to the master cylinder MC.

The master cylinder MC generates a master cylinder hydraulic pressure corresponding to the boosted operating force. Further, the hydro booster HB receives the master cylinder hydraulic pressure to thereby generate a regulator hydraulic pressure corresponding to the boosted operating force, which is substantially the same as the master cylinder hydraulic pressure. The structures and operations of the master cylinder MC and the hydro booster HB are well known, and therefore detailed explanations thereof are omitted. In this manner, the master cylinder MC and the hydro booster HB generate the master cylinder hydraulic pressure and the regulator hydraulic pressure corresponding to the operating force of the brake pedal BP, respectively.

A control valve SA1, which is a normally-open solenoid valve of a 2-port, 2-position type, is interposed between the master cylinder MC and the upstream sides of the FR brake hydraulic pressure adjusting section 33 and the FL brake hydraulic pressure adjusting section 34. Similarly, a control valve SA2, which is the normally-open solenoid valve of a 2-port, 2-position type, is interposed between the hydro booster HB and the upstream sides of the RR brake hydraulic pressure adjusting section 35 and the RL brake hydraulic pressure adjusting section 36.

A control valve SA3, which is a normally-closed solenoid valve of a 2-port, 2-position type, is interposed in a pipe line which connects the upstream sides of the FR brake hydraulic pressure adjusting section 33 and FL brake hydraulic pressure adjusting section 34 to the upstream sides of the RR brake hydraulic pressure adjusting section 35 and RL brake hydraulic pressure adjusting section 36. Further, a switching valve STR, which is a normally-closed solenoid valve of a 2-port, 2-position type, is interposed between the high-pressure generation section 31 and the above-described pipe line.

Thus, to the upstream sides of the FR brake hydraulic pressure adjusting section 33 and FL brake hydraulic pressure adjusting section 34, the master cylinder hydraulic pressure is supplied when the control valve SA1 and the control valve SA3 (and the switching valve STR) are in their unexcited states (illustrated states), and the hydraulic pressure (high pressure) in the accumulator Acc generated by the high-pressure generation section 31 is supplied when the control valve SA1, the control valve SA3, and the switching valve STR are in their excited states.

Similarly, to the upstream sides of the RR brake hydraulic pressure adjusting section 35 and RL brake hydraulic pressure adjusting section 36, the regulator hydraulic pressure is supplied when the control valve SA2, the control valve SA3, and the switching valve STR are in their unexcited states, and the hydraulic pressure in the accumulator Acc is supplied when the control valve SA2, the control valve SA3, and the switching valve STR are in their excited states.

In a branch pipe line branching off the pipe line which connects the master cylinder MC and the control valve SA1, a well-known stroke simulator SS is interposed via a control valve SA4, which is a normally-closed solenoid valve of a 2-port, 2-position type. By virtue of this configuration, when the control valve SAI and the control valve SA2 (together with the control valve SA3 and the switching valve STR) are in their excited states, the operation of the brake pedal BP can be ensured by bringing the control valve SA4 into an excited state as well.

The FR brake hydraulic pressure adjusting section 33 consists of a pressure-increasing valve PUfr, which is a normally-open linear solenoid valve, and a pressure-reducing valve PDfr, which is a normally-closed linear solenoid valve. Thus, the FR brake hydraulic pressure adjusting section 33 can linearly adjust the differential pressure between a hydraulic pressure on the upstream side of the FR brake hydraulic pressure adjusting section 33 and a brake hydraulic pressure (a wheel cylinder pressure Pwfr) in the wheel cylinder Wfr through control of current supplied to the pressure-increasing valve PUfr, and the differential pressure between the wheel cylinder pressure Pwfr and a hydraulic pressure in the reservoir RS through control of current supplied to the pressure-reducing valve PDfr.

Therefore, the wheel-cylinder hydraulic pressure Pwfr can be linearly adjusted to any value through control of the currents supplied to the pressure-increasing valve PUfr and the pressure-reducing valve PDfr, respectively.

In addition, a check valve CV1 which allows flow of the brake fluid in only one direction from the wheel cylinder Wfr side to the upstream side of the FR brake hydraulic pressure adjusting section 33 is connected in parallel with the pressure-increasing valve PUfr. As a result, when the brake pedal BP is released after being operated with the control valve SA1 held in a first state, the wheel cylinder pressure Pwfr can be rapidly decreased.

Similarly, the FL brake hydraulic pressure adjusting section 34, the RR brake hydraulic pressure adjusting section 35, and the RL brake hydraulic pressure adjusting section 36 comprise a pressure-increasing valve PUfl and a pressure-reducing valve PDfl, a pressure-increasing valve PUrr and a pressure-reducing valve PDrr, and a pressure-increasing valve PUrl and a pressure-reducing valve PDrl, respectively. Through control of each pressure-increasing valve and pressure-reducing valve, the brake hydraulic pressures in the wheel cylinder Wfl, the wheel cylinder Wrr, and the wheel cylinder Wrl (wheel cylinder pressures Pwfl, Pwrr, Pwrl) can be adjusted linearly. Check valves CV2, CV3, and CV4 are provided in parallel with the pressure-increasing valves PUfl, PUrr, and PUrl, respectively, to provide the same function as that of the check valve CV1.

Further, a check valve CV5 which allows flow of the brake fluid in only one direction from the upstream side to the downstream side is connected in parallel with the control valve SA2. When the control valve SA2 is held in an excited state in order to break the communication between the hydro booster HB, and the RR brake hydraulic pressure adjusting section 35 and the RL brake hydraulic pressure adjusting section 36, the wheel cylinder pressures Pwrr and Pwrl can be increased through operation of the brake pedal BP.

As described above, the hydraulic-braking-force control apparatus 30 is configured such that when all the solenoid valves are in their unexcited states, a brake hydraulic pressure corresponding to the operation force of the brake pedal BP is supplied to each wheel cylinder. Further, in this state, through control of the pressure-increasing valve PU and the pressure-reducing valve PD, the wheel-cylinder hydraulic pressure Pw** can be linearly adjusted to any value within the range equal to or less than the brake hydraulic pressure (i.e., master cylinder hydraulic pressure) corresponding to the operating force of the brake pedal BP.

Notably, the symbol "" appended to various variables and the like collectively represents the symbols fl, fr, rl, and rr and indicates that the particular variable or the like applies to all of the wheels FR, FL, etc. of the vehicle. For example, the pressure-increasing valve PU collectively indicates the pressure-increasing valve PUfl for the front left wheel, the pressure-increasing valve PUfr for the front right wheel, the pressure-increasing valve PUrl for the rear left wheel, and the pressure-increasing valve PUrr for the rear right wheel (this also applies to the following description).

Further, when the brake pedal BP is not operated (in a released state), the hydraulic-braking-force control apparatus 30 can linearly adjust the wheel-cylinder hydraulic pressure Pw within the range equal to or less than the hydraulic pressure in the accumulator Acc, while using the hydraulic pressure (high pressure) in the accumulator Acc generated by the high-pressure generation section 31, by means of bringing the control valves SAI, SA2, SA3, and SA4, and the switching valve STR into their excited states, and controlling the pressure-increasing valve PU and the pressure-reducing valve PD**.

In this manner, the hydraulic-braking-force control apparatus 30 can individually controls the wheel-cylinder hydraulic pressures of the respective wheels independently of operation of the brake pedal BP, to thereby individually apply hydraulic braking forces to the respective wheels. As a result, in accordance with instructions from the brake control ECU 50, the hydraulic-braking-force control apparatus 30 can achieve regeneration-coordinative brake control to be described later, well-known ABS control, traction control, vehicle stabilization control (specifically, under-steer suppressing control, over-steer suppressing control), and inter-vehicle distance control, etc.

Referring back to FIG. 1, each of the brake control ECU 50, the HV control ECU 60, the engine control ECU 70, and a battery ECU contained in the battery B is formed of a microcomputer which includes a CPU; ROM in which are previously stored programs to be executed by the CPU, tables (look-up tables and maps), constants, and the like; RAM in which the CPU temporarily stores data as necessary; backup RAM which stores data when the power supply is on and which maintains the stored data when the power supply is cut off; an interface containing A/D converters; and the like. The HV control ECU 60 is connected to each of the brake control ECU 50, the engine control ECU 70, and the battery ECU so as to perform CAN communications.

The brake control ECU 50 is connected to wheel speed sensors **81\*\*, a wheel-cylinder hydraulic pressure sensors 82\*\* (see FIG. 2), a brake-pedal depressing force sensor 83, a lateral acceleration sensor 84, a yaw rate sensor 85, and a steering angle sensor 86**.

The wheel speed sensors **81\*\*** are each formed of an electromagnetic pick-up-type sensor, and output signals having frequencies corresponding to the wheel speeds of the wheel\*\*. The wheel-cylinder hydraulic pressure sensors **82\*\*** detect the wheel-cylinder hydraulic pressures of the wheel\*\*, and output signals indicating the wheel-cylinder hydraulic pressures Pw\*\*. The brake-pedal depressing force sensor 83 detects depressing force with which the driver depresses the brake pedal, and outputs a signal indicating the brake-pedal depressing force Fp. The lateral acceleration sensor 84 detects acceleration of the vehicle body in the lateral direction of the vehicle body (lateral acceleration), and outputs a signal indicating the lateral acceleration Gy. The yaw rate sensor 85 detects yaw rate of the vehicle, and outputs a signal indicating the yaw rate Yr. The steering angle sensor 86 detects steering angle of the two front wheels (steerable wheels), and outputs a signal indicating the steering angle θt.

The brake control ECU 50 receives the signals from the sensors 81 to 86, and outputs drive signals to the solenoid valves and the motor MT of the hydraulic-braking-force control apparatus 30.

The HV control ECU 60 is connected to an accelerator opening sensor 87 and a shift position sensor 88. The accelerator opening sensor 87 detects the amount of operation of an unillustrated accelerator pedal by the driver, and outputs a signal indicating the accelerator-pedal operation amount Accp. The shift position sensor 88 detects the shift position of an unillustrated shift lever, and outputs a signal indicating the shift position.

The HV control ECU 60 receives the signals from the sensors 87 and 88, and calculates, on the basis of these signals, a target output for the engine E/G and a target torque for the motor M, which match the traveling conditions. The HV control ECU 60 outputs the target output of the engine E/G to the engine control ECU 70. In response thereto, the engine control ECU 70 controls the opening of an unillustrated throttle valve on the basis of the target output of the engine E/G. As a result, the drive torque of the engine E/G is controlled.

Further, the HV control ECU 60 sends to the inverter I a signal for controlling the AC power supplied to the motor M on the basis of the target torque of the motor M. With this operation, the drive torque of the motor M is controlled.

Further, the HV control ECU 60 receives a signal indicating the above-mentioned SOC from the battery ECU. When the SOC has decreased, the HV control ECU 60 sends to the inverter I a signal for controlling the AC power generated by the generator G. With this operation, the AC power generated by the generator G is converted to DC power, and the battery B is charged.

Further, the HV control ECU 60 calculates a regenerative braking force FE, which is a value of a regenerative braking force to be generated actually, as described later, and sends to the inverter I a signal for controlling the AC power generated by the motor M on the basis of the regenerative braking force FE. With this operation, the regenerative braking force produced by the motor M is controlled to coincide with the regenerative braking force FE.

Outline of Regeneration-Coordinative Brake Control

Next, there will be described the outline of regeneration-coordinative brake control performed by the brake apparatus 10 according to the embodiment of the present invention having the above-described configuration (hereinafter referred to as the "present apparatus"). The present apparatus performs the regeneration-coordinative brake control by determining the above-described regenerative braking force FE, and frictional braking forces (specifically, a front-wheel hydraulic braking force FBf and a rear-wheel hydraulic braking force FBr) on the basis of the three viewpoints below. The front-wheel hydraulic braking force FBf (driven-wheels-side frictional braking force) is the total hydraulic braking force acting on the front wheels; and the rear-wheel hydraulic braking force FBr (non-driven-wheels-side frictional braking force) is the total hydraulic braking force acting on the two rear wheels.

Viewpoint 1: The total braking force (=FE+FBf+FBr) applied to the vehicle is rendered coincident with a target value (a target braking force FT corresponding to "first target braking force", which will be described later) of the total braking force corresponding to the brake pedal depressing force Fp.

Viewpoint 2: The front-rear braking force distribution is rendered coincident, to the greatest possible extent, with a target braking force distribution which will be described later.

Viewpoint 3: A higher priority is given to increasing the regenerative braking force FE to the greatest possible extent than to rendering the front-rear braking force distribution coincident with the target braking force distribution (that is, the highest priority is given to electrical energy collection efficiency).

The greater the brake-pedal depressing force Fp, the greater the value to which the target braking force FT is set in accordance with a previously prepared table in which the brake-pedal depressing force Fp is used as an argument. The target braking force distribution is set such that the proportion of the breaking force distributed to the front wheels becomes larger as compared with the case of a distribution (so-called an ideal braking force distribution) in which locking tends to occur simultaneously at all the wheels of the vehicle (the front-wheel-side distribution ratio is maintained at Kd; see FIG. 3B).

A specific method of determining the regenerative braking force FE, the front-wheel hydraulic braking force FBf, and the rear-wheel hydraulic braking force FBr will be described below with reference to FIGS. 3A and 3B. First, there will be described a case (hereinafter, called "the case of a first mode" (mode=1)) where the target braking force FT determined on the basis of the brake pedal depressing force Fp is equal to or lower than a limit regenerative braking force FE1.

Here, the limit regenerative braking force FE1 is the upper limit value of the regenerative braking force FE. In principle, the limit regenerative braking force FE1 is set to a value equal to an allowable maximum regenerative braking force FEmax, which is the maximum value of the regenerative braking force that can be generated at the present time. The limit regenerative braking force FE1, however, can be changed within the range which is equal to or lower than the allowable maximum regenerative braking force FEmax, as described later. The allowable maximum regenerative braking force FEmax is calculated from the value of SOC, the vehicle body speed determined on the basis of the output of the wheel speed sensor 81** (estimated vehicle body speed Vso to be described later), etc. The description will be continued under the assumption that the limit regenerative braking force FE1 is equal to the allowable maximum regenerative braking force FEmax.

The first mode corresponds to the case where the brake-pedal depressing force Fp is equal to or less than a value Fa. Point A corresponds to the case where the brake-pedal depressing force Fp is equal to the value Fa. In the case of the first mode, the regenerative braking force FE is set to the value of the target braking force FT, and the front-wheel hydraulic braking force FBf and the rear-wheel hydraulic braking force FBr are both set to zero.

Thus, the total braking force (=FE+FBf+FBr) coincides with the target braking force FT. When the brake-pedal depressing force Fp (accordingly, the target braking force FT) increases, only the regenerative braking force FE increases, whereby the front-wheel braking force increases but the rear-wheel braking force is maintained at zero (see the straight line p). Thus, because in the first mode the highest priority is placed on electrical energy collection efficiency, the proportion of the front-wheel braking force becomes larger than the front-wheel-side distribution ratio Kd corresponding to the target braking force distribution.

Next, there will be described a case (hereinafter, called "the case of a second mode" (mode=2)) where the target braking force FT is greater than the limit regenerative braking force FE1 (=FEmax), and a front-wheel braking force (=FT·Kd; hereinafter, called the "front-wheel-side target distribution braking force") produced as a result of distribution of the target braking force FT performed in accordance with the target braking force distribution is equal to or smaller than the limit regenerative braking force FE1 (=FEmax).

The second mode corresponds to the case where the brake-pedal depressing force Fp is greater than the value Fa, and equal to or lower than a value Fb. Point B corresponds to the case where the brake-pedal depressing force Fp is equal to the value Fb. In the case of the second mode, the regenerative braking force FE is set to the value of the limit regenerative braking force FE1; the rear-wheel hydraulic braking force FBr is set to a value (FT−FE1) obtained by subtracting the limit regenerative braking force FE1 from the target braking force FT; and the front-wheel hydraulic braking force FBf is set to zero.

Thus, the total braking force (=FE+FBf+FBr) coincides with the target braking force FT. When the brake-pedal depressing force Fp (accordingly, the target braking force FT) increases, only the rear-wheel hydraulic braking force FBr increases, whereby the rear-wheel braking force increases, but the front-wheel braking force is maintained at the limit regenerative braking force FE1 (=FEmax) (see the straight line q). Thus, because in the second mode the highest priority is placed on electrical energy collection efficiency as in the case of the first mode, the proportion of the front-wheel braking force becomes larger than front-wheel-side distribution ratio Kd corresponding to the target braking force distribution.

Next, there will be described a case (hereinafter, called "the case of a third mode" (mode=3)) where the front-wheel-side target distribution braking force (=FT·Kd) is greater than the limit regenerative braking force FE1 (=FEmax). The third mode corresponds to the case where the brake-pedal depressing force Fp is greater than the value Fb. In the case of the third mode, the regenerative braking force FE is set to the value of the limit regenerative braking force FE1; the rear-wheel hydraulic braking force FBr is set to a value of the rear-wheel braking force (=FT·(1−Kd) which is produced as a result of distribution of the target braking force FT performed in accordance with the target braking force distribution; hereinafter, called the "rear-wheel-side target distribution braking force"); and the front-wheel hydraulic braking force FBf is set to a value obtained by subtracting the limit regenerative braking force FE1 from the front-wheel-side target distribution braking force (=FT·Kd).

Thus, the total braking force (=FE+FBf+FBr) coincides with the target braking force FT. When the brake-pedal depressing force Fp (accordingly, the target braking force FT) increases, both the front-wheel hydraulic braking force FBf and the rear-wheel hydraulic braking force FBr increase, whereby the front-wheel braking force and the rear-wheel braking force increase (see the straight line r). Thus, in the case of the third mode, the front-rear braking force distribution coincides with the target braking force distribution.

As described above, in any case of the first, second, and third modes, the total braking force (=FE+FBf+FBr) coincides with the target braking force FT. Further, in the case of any of these modes, the regenerative braking force FE is set to a largest possible value. That is, electrical energy collection efficiency has the highest priority.

Therefore, in the first and second modes, the proportion of the front-wheel braking force is greater than the front-wheel-side distribution ratio Kd corresponding to the target braking force distribution. Notably, the first and second modes correspond to the case where the regenerative braking force FE is adjusted so as to become greater than the front-wheel-side target distribution braking force (FT·Kd). Up to this point, there has been described the outline of the regeneration-coordinative brake control performed in the case where the limit regenerative braking force FE1 is equal to the allowable maximum regenerative braking force FEmax.

Changing Limit Regenerative Braking Force in Consideration of Easiness of Occurrence of Locking Tendency As described above, in the cases of the first and second modes, the regenerative braking force FE is adjusted so as to become greater than the front-wheel-side target distribution braking force (FT·Kd), whereby the proportion of the front-wheel braking force is greater than the front-wheel-side distribution ratio Kd corresponding to the target braking force distribution. This means, however, that the front wheels (driven wheels) become more likely to lock. In addition, this leads to an increase in frequency with which ABS control is performed for the front wheels.

Therefore, when the operation mode is in the first or second mode and the vehicle is under a traveling condition in which a locking tendency of the front wheels easily occurs, it is preferred to decrease the proportion of the regenerative braking force FE and increase the proportion of the rear-wheel hydraulic braking force FBr (frictional braking force of the non-driven wheels), to thereby previously bring the front-rear braking force distribution close to the target braking force distribution.

There are four possible traveling conditions of the vehicle in which a locking tendency of the front wheels easily occurs. A first case is where the lateral acceleration Gy of the vehicle is large. In this case, the greater the lateral acceleration Gy, the smaller the load acting on the wheels located on the inner side of a turning locus, whereby a locking tendency easily occurs at the front wheel located on the inner side of the turning locus.

A second case is where a turning motion of the vehicle approaches the limit of the vehicle. In this case, the more closely the turning motion of the vehicle approaches the limit of the vehicle, the greater the tendency of the vehicle to skid, whereby a locking tendency easily occurs at the front wheels (particularly, the front wheel located on the inner side of the turning locus).

In general, the greater the degree to which the turning motion of the vehicle approaches the limit of the vehicle, the greater the absolute value ($|\theta t-\theta test|$) of the difference between an actual steering angle $\theta t$ of the front wheels and an estimated steering angle ($\theta test$) of the front wheels which is calculated in accordance with the following Equation (1) and utilizing a vehicle model.

$$\theta test = Yr \cdot (Z/Vso) \cdot (1+Kh \cdot Vso^2) \quad (1)$$

In Equation (1), Yr represents the yaw rate of the vehicle obtained from the yaw rate sensor 85; Z represents the wheel base (constant) of the vehicle; and Kh represents a stability factor (constant). Equation (1) corresponds to an equation which is obtained by solving the following Equation (2) for the steering angle $\theta t$. Equation (2) is used to calculate an estimated yaw rate Yrt when the vehicle turns with the steering angle $\theta t$ and an estimated vehicle body speed Vso both maintained constant (during steady circular turning).

$$Yrt = ((Vso \cdot \theta t)/Z) \cdot (1/(1+Kh \cdot Vso^2)) \quad (2)$$

Therefore, if a vehicle body lateral direction limit index value L is defined to be equal to $|\theta t-\theta test|$, then the greater the vehicle body lateral direction limit index value L, the more the degree of easiness of occurrence of a locking at the front wheel on the inner side of the turning locus.

A third case is where the frictional coefficient $\mu$ of a road surface is small. In this case, the smaller the road-surface frictional coefficient $\mu$, the more likely the occurrence of a locking tendency of the front wheels. A fourth case is where the gradient Grad of an uphill road surface is large. In this case, the greater the road-surface gradient Grad, the smaller the load acting on the front wheels, whereby a locking tendency of the front wheels occurs more easily.

Meanwhile, in the cases of the first and second modes, in order to render the front-rear braking force distribution close to the target braking force distribution by means of decreasing the proportion of the regenerative braking force FE and increasing the proportion of the rear-wheel hydraulic braking force FBr while rendering the total braking force (=FE+FBf+ FBr) coincident with the target braking force FT, the value of the limit regenerative braking force FE1 is made smaller than the value of the allowable maximum regenerative braking force FEmax.

Figure 3A:
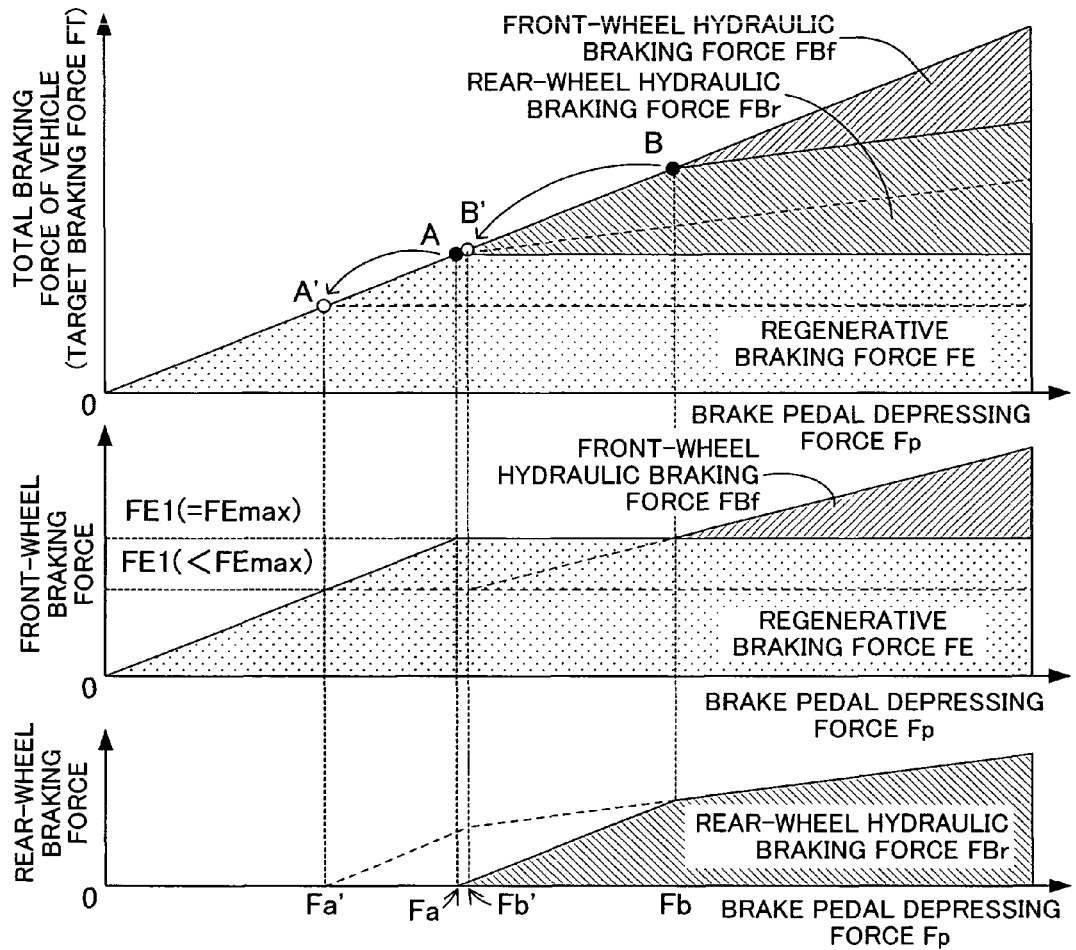
FIGS. 3A and 3B are graphs showing changes in front-wheel braking force (front-wheel hydraulic braking force and regenerative braking force) and rear-wheel braking force (rear-wheel hydraulic braking force), which are adjusted by the brake apparatus shown in FIG. 1 in accordance with brake-pedal depressing force.
Figure 3B:
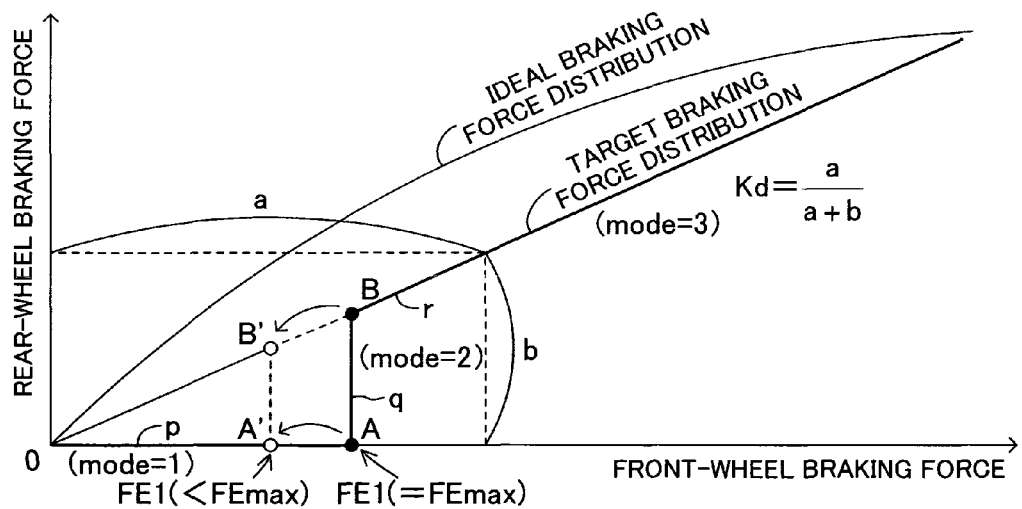
Figure 4A:
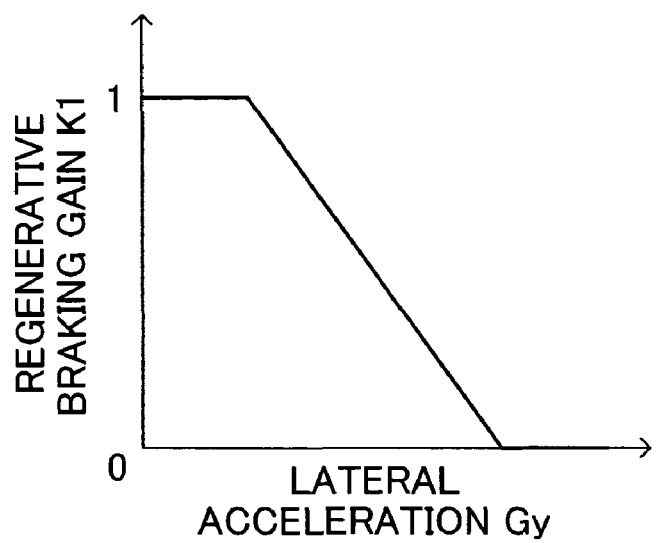
FIG. 4A is a graph showing the relation between lateral acceleration and regenerative braking gain.
Figure 4B:
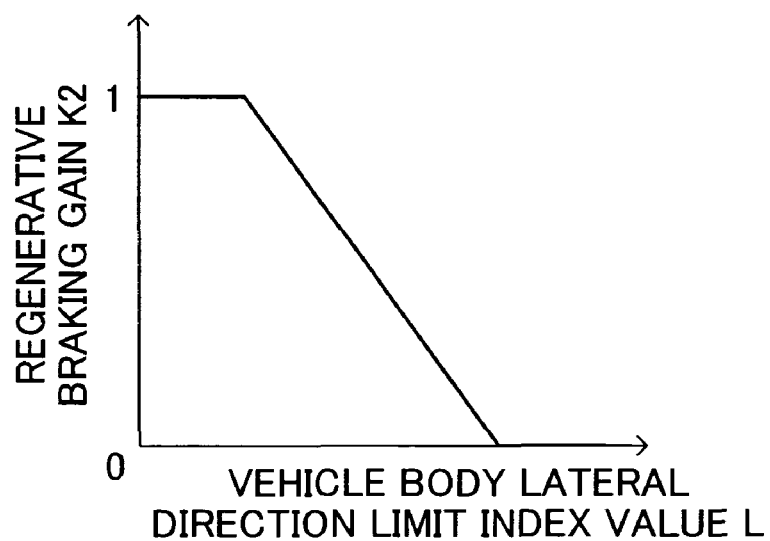
FIG. 4B is a graph showing the relation between vehicle body lateral direction limit index value and the regenerative braking gain.
Figure 4C:
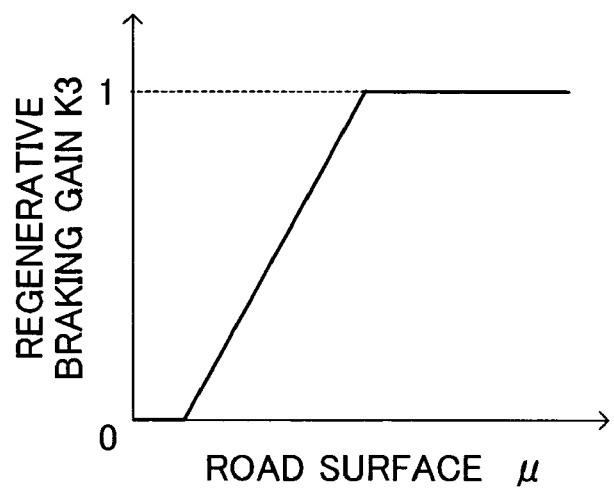
FIG. 4C is a graph showing the relation between road-surface frictional coefficient and the regenerative braking gain.
Figure 4D:
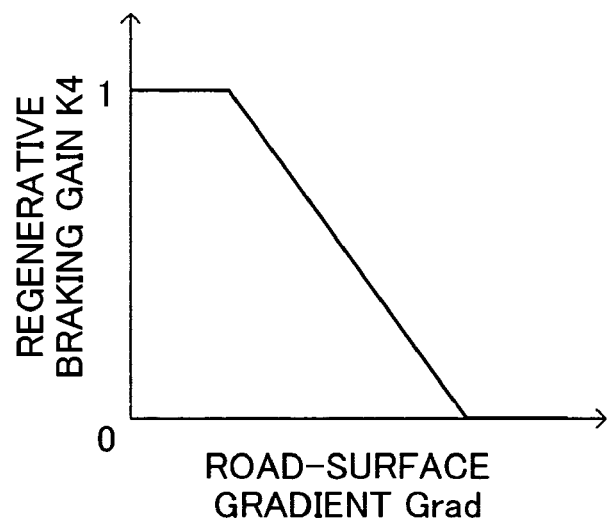
FIG. 4D is a graph showing the relation between road-surface gradient and the regenerative braking gain.

That is, when the value of the limit regenerative braking force FE1 is made smaller than the allowable maximum regenerative braking force FEmax, points A and B in FIGS. 3A and 3B move to points A' and B' respectively. As a result, as indicated by a broken line in FIG. 3A, when the brake-pedal depressing force Fp is greater than a value Fa' and equal or less than the value Fb (that is, in the first and second modes), the proportion of the regenerative braking force FE decreases, and the proportion of the rear-wheel hydraulic braking force FBr increases, whereby the front-rear braking force distribution approaches the target braking force distribution. In other words, the amount by which the regenerative braking force FE become larger than the front-wheel-side target distribution braking force (FT·Kd) decreases. Notably, the point A' corresponds to the case where the brake-pedal depressing force Fp becomes equal to Fa'; and the point B' corresponds to the case where the brake-pedal depressing force Fp becomes equal to Fb'.

From the above, the present apparatus obtains regenerative braking gains K1 to K4 ($0 \leq K1$ to $K4 \leq 1$) using the relations shown by the graphs of FIG. 4A to FIG. 4D and then determines the limit regenerative braking force FE1 in accordance with Equation (3) below.

$$FE1 = FEmax \cdot K1 \cdot K2 \cdot K3 \cdot K4 \quad (3)$$

Thus, when a locking tendency of the front wheels is unlikely to occur (that is, Gy, L, and Grad have small values, and pi has a large value), the regenerative braking gains K1 to K4 become 1. As a result, the limit regenerative braking force FE1 becomes equal to the allowable maximum regenerative braking force FEmax. Meanwhile, the more likely the front wheels are to lock (that is, the larger Gy, L, and Grad and the smaller $\mu$), the smaller the value of the regenerative braking gains K1 to K4, whereby the limit regenerative braking force FE1 becomes smaller.

As described above, the present apparatus changes the limit regenerative braking force FE1 to any value which is equal to or less than the allowable maximum regenerative braking force FEmax in accordance with the likelihood that a locking tendency of the front wheels will occur. Therefore, when the regenerative braking force FE becomes greater than the front-wheel-side target distribution braking force (FT·Kd) (in the first and second modes), the amount by which the regenerative braking force FE is greater than the front-wheel-side proportion braking force (FT·Kd) is changed. The above is the outline of the operation of changing the limit regenerative braking force in consideration of the easiness of occurrence of a locking tendency.

Actual Operation

Actual operation of the brake control apparatus 10 according to the embodiment of the present invention will be explained while referring to FIG. 5, which shows routines executed by the brake control ECU 50 (its CPU) in the form of a flowchart, and FIG. 6, which shows routines executed by the HV control ECU 60 (its CPU) in the form of a flowchart.

Figure 5:
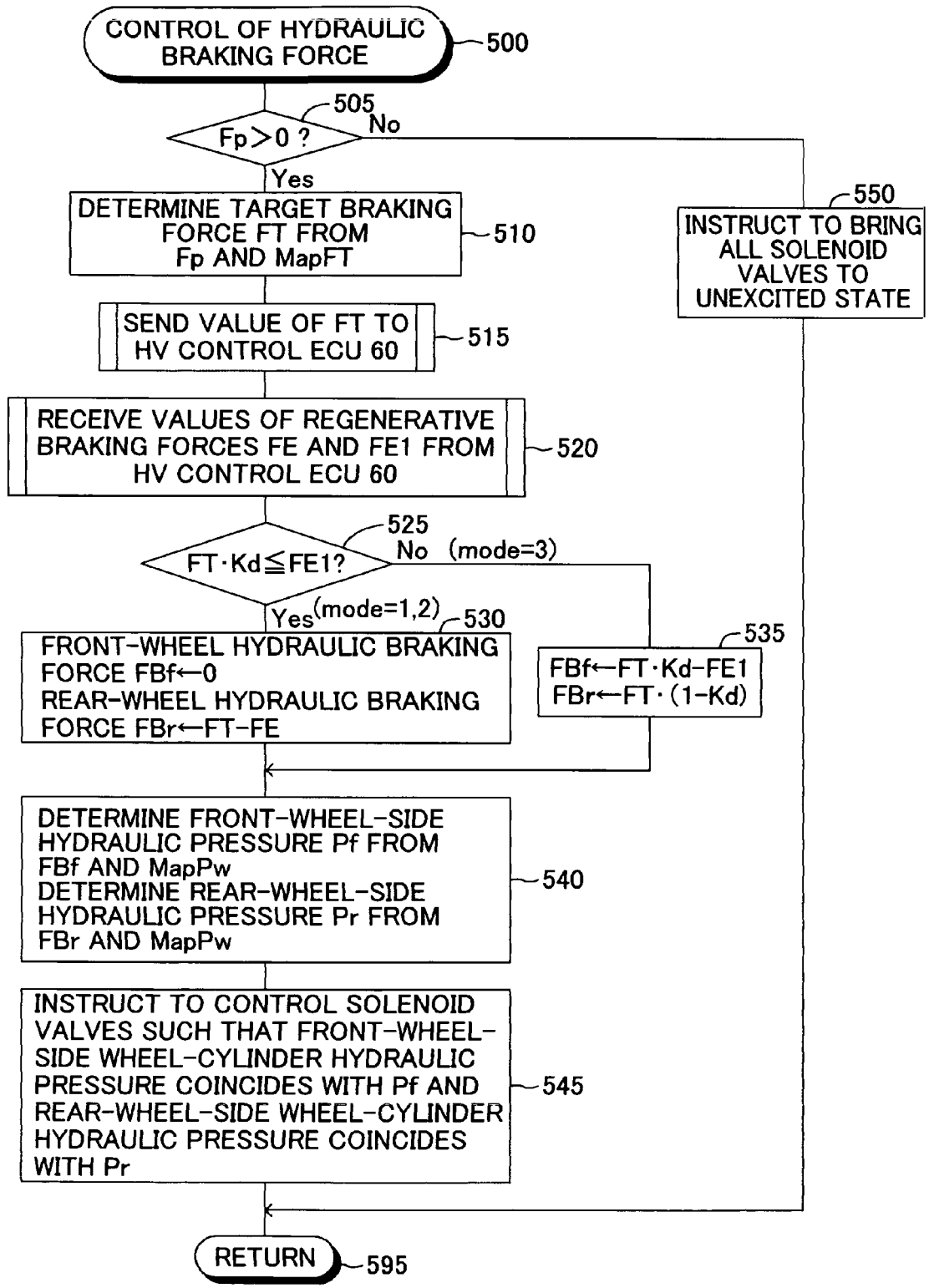
FIG. 5 is a flowchart showing a routine which the brake control ECU shown in FIG. 1 executes in order to perform control of hydraulic braking force.

The brake control ECU 50 repeatedly performs, at predetermined intervals (execution intervals $\Delta t$; e.g., 6 msec), the routine shown in FIG. 5 for controlling hydraulic braking force. Accordingly, when a predetermined timing is reached, the brake control ECU 50 starts processing of the routine from Step 500, and proceeds to Step 505 so as to determine whether or not the brake pedal depressing force Fp at the present time, which is obtained from the brake-pedal depressing force sensor 83, is greater than zero (that is, whether or not the brake pedal BP is being operated).

Here, the brake pedal BP is assumed to be operated currently. In this case, the brake control ECU 50 makes a "Yes" determination in Step 505, and then proceeds to Step 510 so as to determine the target braking force FT from the brake pedal depressing force Fp with reference to a table MapFT (Fp) for obtaining the target braking force FT while using the brake pedal depressing force Fp as an argument. As a result, the greater the brake-pedal depressing force Fp, the greater the value to which the target braking force FT is set. The brake control ECU 50 is thus an example of determination means for determining a first target braking force based on braking operation.

Next, the brake control ECU 50 proceeds to Step 515, and sends the value of the target braking force FT determined in Step 510 to the HV control ECU 60 via CAN communications. In Step 520 subsequent thereto, the brake control ECU 50 receives, via CAN communications, the latest value of the regenerative braking force FE and the latest value of the limit regenerative braking force FE1 calculated by the HV control ECU 60 in a routine to be described later.

Subsequently, the brake control ECU 50 proceeds to Step 525, and determines whether or not a value obtained by multiplying the target braking force FT by the above-mentioned front-wheel-side distribution ratio Kd (that is, the front-wheel-side target distribution braking force (=FT·Kd)) is equal to or less than the limit regenerative braking force FE1. When the brake control ECU 50 makes a "Yes" determination in Step 525 (that is, in the case of the first or second mode), the brake control ECU 50 proceeds to Step 530 so as to set the front-wheel hydraulic braking force FBf to zero, and to set the rear-wheel hydraulic braking force FBr to a value (FT−FE) obtained by subtracting the regenerative braking force FE from the target braking force FT.

Here, in the case of the first mode, the value of the regenerative braking force FE received in Step 520 is equal to the target braking force FT, so that the rear-wheel hydraulic braking force FBr is set to zero. In the case of the second mode, the value of the regenerative braking force FE received in Step 520 is equal to the limit regenerative braking force FE1, so that the rear-wheel hydraulic braking force FBr is set to "FT−FE1" (see FIG. 3A).

Meanwhile, when the brake control ECU 50 makes a "No" determination in Step 525 (that is, in the case of the third mode), the brake control ECU 50 proceeds to Step 535 so as to set the front-wheel hydraulic braking force FBf to a value "FT·Kd−FE1" obtained by subtracting the limit regenerative braking force FE1 from the front-wheel-side proportion braking force (=FT·Kd), and to set the rear-wheel hydraulic braking force FBr to a value "FT·(1−Kd)" obtained by multiplying the target braking force FT by the rear-wheel-side distribution ratio (=1−Kd) (see FIG. 3A).

Subsequently, the brake control ECU 50 proceeds to Step 540; determines the front-wheel-side hydraulic pressure Pf, which is the wheel-cylinder hydraulic pressure target value of the front wheels, from the front-wheel hydraulic braking force FBf with reference to a table MapPw(FBf) for obtaining the wheel-cylinder hydraulic pressure Pw while using FBf as a augment; and determines the rear-wheel-side hydraulic pressure Pr, which is the wheel-cylinder hydraulic pressure target value of the rear wheels, from the rear-wheel hydraulic braking force FBr with reference to a table MapPw(FBr) for obtaining the wheel-cylinder hydraulic pressure Pw while using FBr as an argument. With this processing, the greater the front-wheel hydraulic braking force FBf, the greater the value to which the front-wheel-side hydraulic pressure Pf is set; and the greater the rear-wheel hydraulic braking force FBr, the greater the value to which the rear-wheel-side hydraulic pressure Pr is set.

The brake control ECU 50 then proceeds to Step 545, and outputs instructions for controlling various solenoid valves in the hydraulic-braking-force control apparatus 30 such that the wheel-cylinder hydraulic pressure Pf* of the front wheels obtained from the wheel-cylinder hydraulic pressure sensor 82f* becomes equal to the front-wheel-side hydraulic pressure Pf and such that the wheel-cylinder hydraulic pressure Pr* of the rear wheels obtained from the wheel-cylinder hydraulic pressure sensor 82r* becomes equal to the rear-wheel-side hydraulic pressure Pr. Subsequently, the brake control ECU 50 proceeds to Step 595 so as to end the current execution of the present routine. With this processing, the sum of hydraulic braking forces of the front wheels is controlled to coincide with the front-wheel hydraulic braking force FBf, and the sum of hydraulic braking forces of the rear wheels is controlled to coincide with the rear-wheel hydraulic braking force FBr.

Meanwhile, if the brake pedal BP is assumed not to be being operated, the brake control ECU 50 makes a "No" determination when it proceeds to Step 505, and then proceeds to Step 550. In this case, the brake control ECU 50 outputs instructions for bringing all the solenoid valves in the hydraulic-braking-force control apparatus 30 to the unexcited state and then proceeds to Step 595 so as to end the current execution of the present routine. With this processing, the sum of hydraulic braking forces of the front wheels and the sum of hydraulic braking forces of the rear wheels become zero.

Figure 6:
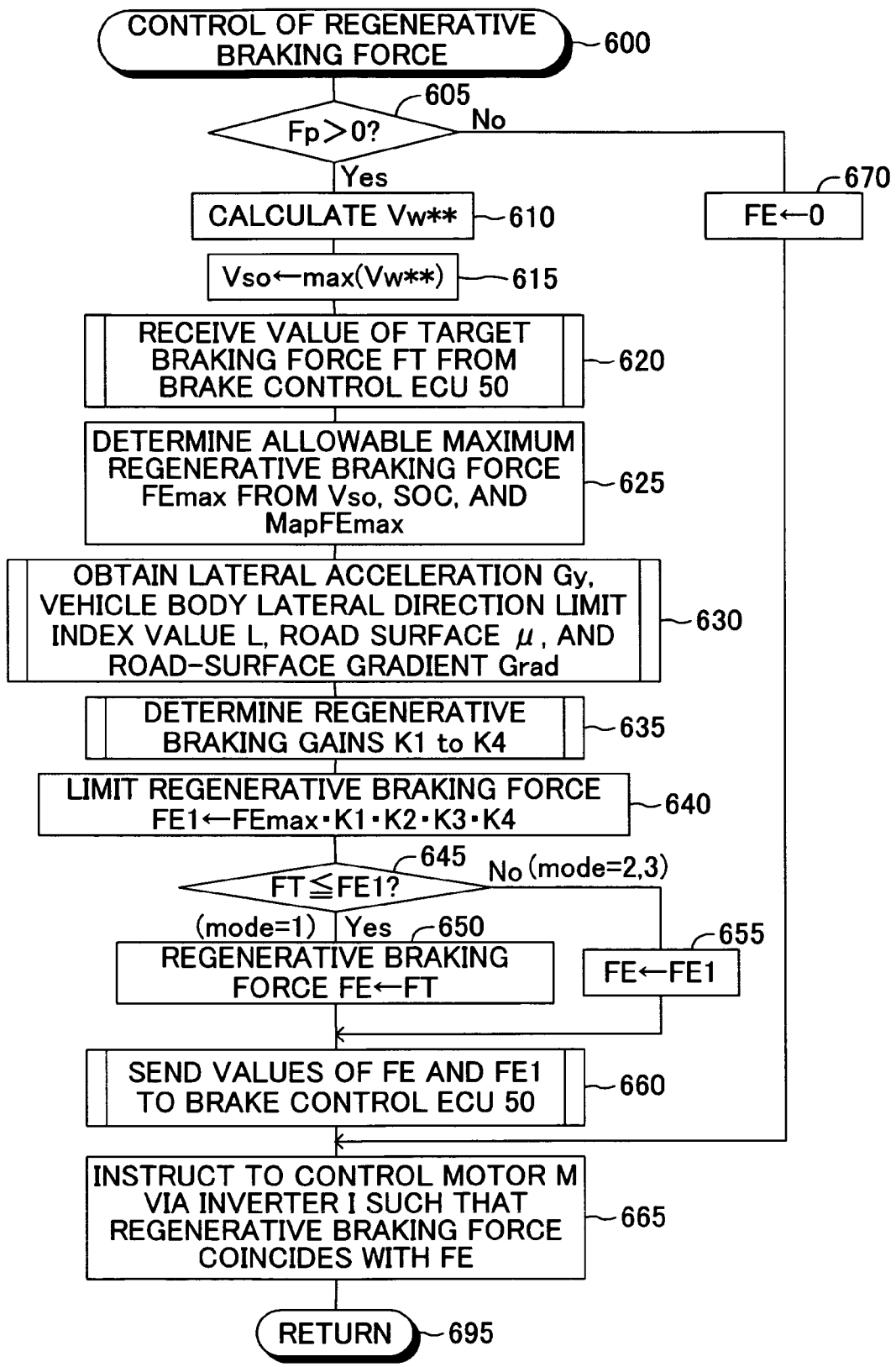
FIG. 6 is a flowchart showing a routine which the hybrid control ECU shown in FIG. 1 executes in order to perform control of the regenerative braking force.

Meanwhile, the HV control ECU 60 repeatedly performs, at predetermined intervals (execution intervals Δt; e.g., 6 msec), the routine shown in FIG. 6 for controlling regenerative braking force. Accordingly, when a predetermined timing is reached, the HV control ECU 60 starts processing of the routine from Step 600, and proceeds to Step 605 so as to perform the same processing as in the above-described Step 505.

Here, if the brake pedal BP is assumed to be operated currently, the HV control ECU 60 makes a "Yes" determination in Step 605, and then proceeds to Step 610 in order to calculate the wheel speed Vw of the wheel (the speed of the outer periphery or the wheel) at the present moment. Specifically, the HV control ECU 60 calculates the wheel speed Vw on the basis of the changing frequency of a signal output by each wheel speed sensor 81. Next, the HV control ECU 60 proceeds to Step 615 and sets the estimated vehicle body speed Vso to the highest value among the wheel speeds Vw.

Subsequently, the HV control ECU 60 proceeds to Step 620, and receives, via CAN communications, the value of the target braking force FT sent from the brake control ECU 50 by means of the processing of the previously described Step 515. Next, the HV control ECU 60 proceeds to Step 625, and determines the allowable maximum regenerative braking force FEmax on the basis of the estimated vehicle body speed Vso which has been obtained in the previously described Step 615 and the value of the above-described SOC obtained from the battery ECU, with reference to a table MapFEmax for obtaining the allowable maximum regenerative braking force FEmax while using Vso and SOC as arguments. The HV control ECU 60 is thus an example of allowable-maximum-regenerative-braking-force determination means for determining an allowable maximum regenerative braking force.

Next, the HV control ECU 60 proceeds to Step 630, and obtains a lateral acceleration Gy from the lateral acceleration sensor 84; obtains a vehicle body lateral direction limit index value L=|θt−θtest| on the basis of a steering angle θt obtained from the steering angle sensor 86, a yaw rate Yr obtained from the yaw rate sensor 85, the above-mentioned estimated vehicle body speed Vso, and the above described Equation (I); obtains a road-surface frictional coefficient μ on the basis of information on the road-surface frictional coefficient μ, acquired via the road-to-vehicle communications; and obtains a road-surface gradient Grad on the basis of information regarding the road-surface gradient Grad, acquired via the road-to-vehicle communications. The HV control ECU 60 is thus an example of acquisition means for acquiring a factor (e.q., lateral acceleration, vehicle body lateral direction limit index value, road-surface frictional coefficient, and road-surface gradient) influencing the easiness of occurrence of a locking tendency of the driven wheels when the driven wheels have no locking tendency.

Next, the HV control ECU 60 proceeds to Step 635, and determines the regenerative braking gains K1 to K4 from the lateral acceleration Gy, the vehicle body lateral direction limit index value L, the road-surface frictional coefficient μ, and the road-surface gradient Grad which have been obtained in Step 630, with reference to corresponding tables for obtaining the regenerative braking gains K1 to K4 shown in the graphs of FIG. 4A to FIG. 4D. Subsequently, the HV control ECU 60 proceeds to Step 640, and determines the limit regenerative braking force FE1 on the basis of the regenerative braking gains K1 to K4, the allowable maximum regenerative braking force FEmax, and Equation (3). Thus, the HV control ECU 60 is an example of limit-regenerative-braking-force acquisition means for acquiring a limit regenerative braking force.

Next, the HV control ECU 60 proceeds to Step 645, and determines whether or not the target braking force FT received in Step 620 is equal to or less than the limit regenerative braking force FE1. When the HV control ECU 60 makes a "Yes" determination in Step 645 (that is, in the case of the first mode), the HV control ECU 60 proceeds to Step 650 so as to set the regenerative braking force FE to a value equal to the target braking force FT. When the HV control ECU 60 makes a "No" determination in Step 645 (that is, in the case of the second or third mode), the HV control ECU 60 proceeds to Step 655 so as to set the regenerative braking force FE to a value equal to the limit regenerative braking force FE1 (see FIG. 3A).

Next, the HV control ECU 60 proceeds to Step 660, and sends the values of the regenerative braking force FE and the limit regenerative braking force FE1 to the brake control ECU 50 via CAN communications. The values of the regenerative braking force FE and the limit regenerative braking force FE1 sent in this manner are received by the brake control ECU 50 in the previously described step 520.

The HV control ECU 60 then proceeds to Step 665, and outputs an instruction to the inverter I for controlling the motor M via the inverter I such that the actual regenerative braking force coincides with the regenerative braking force FE. After that, the HV control ECU 60 proceeds to Step 695 so as to end the current execution of the present routine. With this processing, the motor M is controlled such that the regenerative braking force stemming from the power generation resistance of the motor M coincides with the regenerative braking force FE.

Meanwhile, if the brake pedal BP is assumed not to be operated currently, the HV control ECU 60 makes a "NO" determination when it proceeds to Step 605, and then proceeds to Step 670 so as to set the regenerative braking force FE to zero. After that, the HV control ECU 60 performs the processing of Step 665. As a result, the regenerative braking force becomes zero. Further, in this case, the sum of hydraulic braking forces of the front wheels and the sum of hydraulic braking forces of the rear wheels also become zero as described above, so that the total braking force becomes zero.

As described above, in the brake (control) apparatus for a vehicle according to the embodiment of the present invention, in any of the first, second, and third modes, the total braking force (=FE+FBf+FBr) coincides with the target braking force FT. Further, in any of the first, second, and third modes, the regenerative braking force FE is set to a largest possible value. That is, electrical energy collection efficiency is given the highest priority. Therefore, in the case of the first and second modes, the regenerative braking force FE becomes greater than the front-wheel-side target distribution braking force (=FTKd), and the proportion of the front-wheel braking force is greater than the front-wheel-side distribution ratio Kd corresponding to the target braking force distribution. In this regard, the brake control ECU 50 and the HV control ECU 60 constitute an example of adjustment means for adjusting the regenerative braking force and the frictional braking forces.

Meanwhile, in an early stage before detection of a locking tendency of front wheels (driven wheels), the limit regenerative braking force FE1 is decreased from the allowable maximum regenerative braking force FEmax by an amount corresponding to the degree of easiness of occurrence of a locking tendency of the front wheels. Accordingly, the brake control ECU 50 and the HV control ECU 60 constitute an example of change means for changing an amount by which the regenerative braking force becomes greater than the target braking force. With this operation, in the first and second modes, the proportion of the regenerative braking force FE becomes smaller, and the proportion of the rear-wheel hydraulic braking force FBr becomes greater, whereby the front-rear braking force distribution approaches the target braking force distribution. As a result, at a point in time when a locking tendency of the front wheels is detected, the regenerative braking force FE can be made small enough to suppress the locking of the front wheels, which would otherwise be caused at a later time by the regenerative braking force FE.

The present invention is not limited to the above-described embodiment, and various modifications may be employed within the scope of the present invention. For example, in the above-described embodiment, the present invention is applied to a vehicle comprising two front wheels driven by a motor M (driven wheels) and two rear wheels not driven by the motor M (non-driven wheels). However, the present invention may be applied to a vehicle comprising two rear wheels driven by a motor M (driven wheels) and two front wheels not driven by the motor M (non-driven wheels).

Figure 7A:
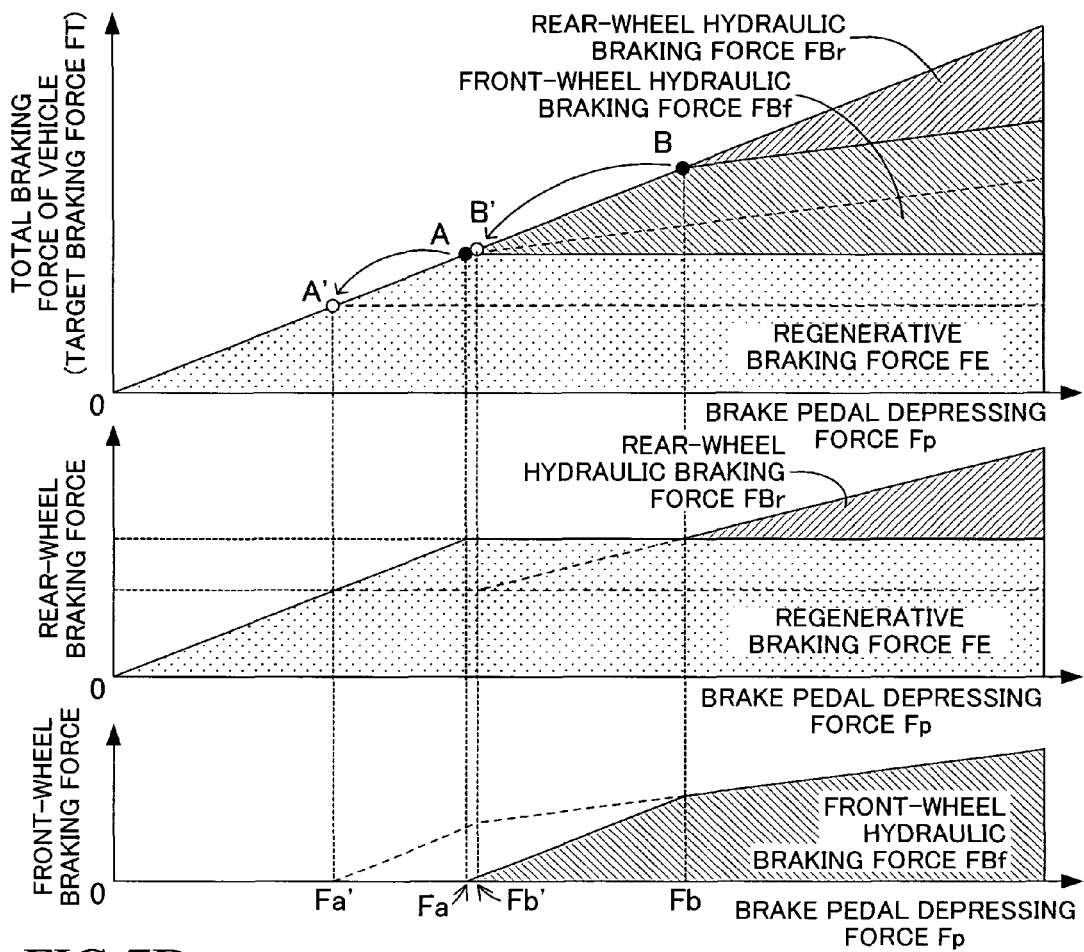
FIGS. 7A and 7B are graphs showing changes in front-wheel braking force (front-wheel hydraulic braking force) and rear-wheel braking force (rear-wheel hydraulic braking force and regenerative braking force), in a case where the brake apparatus according to the present invention is applied to a rear-wheel-drive vehicle comprising two rear wheels driven by a motor (driven wheels) and two front wheels not driven by the motor (non-driven wheels).
Figure 7B:
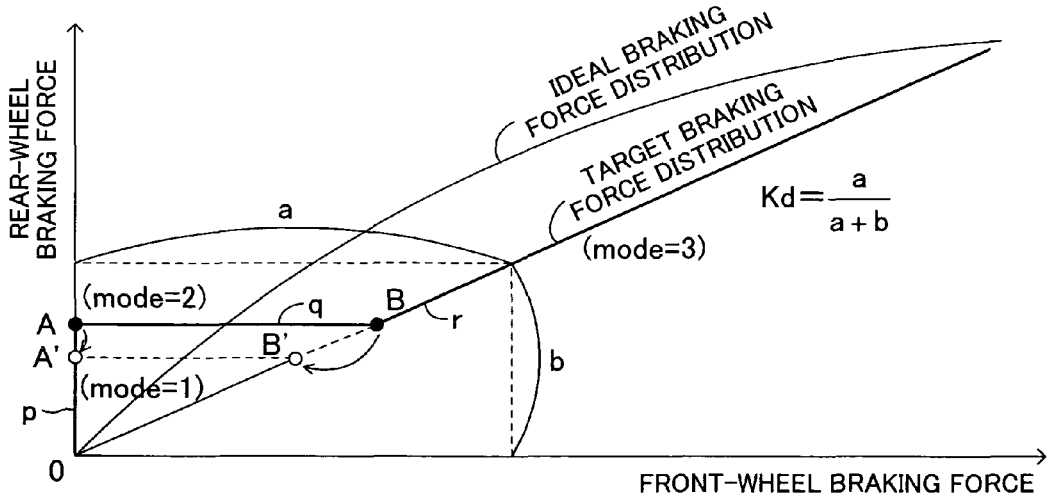

FIGS. 7A and 7B are graphs showing changes in the regenerative braking force FE, the front-wheel hydraulic braking force FBf, and the rear-wheel hydraulic braking force FBr, which are determined on the basis of the above-described three viewpoints as in the above-described embodiment.

As shown in FIGS. 7A and 7B, in the case of the first mode, the regenerative braking force FE is set to the value of the target braking force FT, and the front-wheel hydraulic braking force FBf and the rear-wheel hydraulic braking force FBr are both set to zero. In the case of the second mode, the regenerative braking force FE is set to the value of the limit regenerative braking force FE1; the front-wheel hydraulic braking force FBf is set to a value (FT−FE1) obtained by subtracting the limit regenerative braking force FE1 from the target braking force FT; and the rear-wheel hydraulic braking force FBr is set to zero. Because the highest priority is placed on electrical energy collection efficiency in the first and second modes, the regenerative braking force FE becomes larger than the rear-wheel-side target distribution braking force (=FT·(1−Kd)), and the proportion of rear-wheel braking force becomes larger than rear-wheel-side distribution ratio (=1−Kd) corresponding to the target braking force distribution.

In the case of the third mode, the regenerative braking force FE is set to the value of the limit regenerative braking force FE1; the front-wheel hydraulic braking force FBf is set to the value of the front-wheel-side target distribution braking force (=FT·Kd); and the rear-wheel hydraulic braking force FBr is set to a value obtained by subtracting the limit regenerative braking force FE1 from the rear-wheel-side target distribution braking force (=FT·(1−kd)). In case of the third mode, the front-rear braking force distribution coincides with the target braking force distribution.

In an early stage before detection of a locking tendency of rear wheels (driven wheels), the limit regenerative braking force FE1 is decreased by an amount corresponding to the degree of easiness of occurrence of a locking tendency at the rear wheels. With this operation, in the first and second modes, the proportion of the regenerative braking force FE becomes smaller, and the proportion of the front-wheel hydraulic braking force FBf becomes greater, whereby the front-rear braking force distribution approaches the target braking force distribution. As a result, when a tendency of rear wheel locking is detected, the regenerative braking force FE can become small enough to suppress locking of the rear wheels, which would otherwise be caused at a later time by the regenerative braking force FE.

Further, in the above-described embodiment, because the regenerative braking force FE is set to a largest possible value, the regenerative braking force FE is set to the value equal to the target braking force FT in the first mode, and is set to the value equal to the limit regenerative braking force FE1 in the second mode (and the third mode). However, the regenerative braking force FE may be set to a value less than the target braking force FT (and a value larger than the front-wheel-side target distribution braking force FT·Kd) in the first mode, and may be set to a value less than the limit regenerative braking force FE1 (and a value larger than the front-wheel-side target distribution braking force FT·Kd) in the second mode.

In this case, preferably, from the viewpoint of bringing the front-rear braking force distribution close to the target braking force distribution, the rear-wheel hydraulic braking force FBr is increased, in the first mode, by an amount corresponding to a decrease of the regenerative braking force FE from the target braking force FT, and in the second mode, by an amount corresponding to a decrease of the regenerative braking force FE from the limit regenerative braking force FE1.

Further, in the above-described embodiment, the lateral acceleration (detected value) Gy obtained from the lateral acceleration sensor 84 is used as the lateral acceleration of the vehicle, which is "a factor influencing the easiness of occurrence of a locking tendency of the driven wheels." However, there may be used an estimated lateral acceleration value (Vso·Yr) determined by multiplying the estimated vehicle body speed Vso by the yaw rate (detected value) Yr obtained from the yaw rate sensor 85, or the estimated lateral acceleration value (Vso·Yrt) determined by multiplying the estimated vehicle body speed Vso by the yaw rate (estimated value) Yrt obtained from Equation (2).

Further, in the above-described embodiment, the difference (=|θt−θtest|) between the steering angle (detected value) θt of the steering wheels and the estimated steering angle θtest obtained from Equation (1) is used as the vehicle body lateral direction limit index value which is "a factor influencing the easiness of occurrence of a locking tendency of the driven wheels." However, there may be used the difference (=|Yr−Yrt|) between the yaw rate (detected value) Yr obtained from the yaw rate sensor 85 and the yaw rate (estimated value) Yrt obtained from Equation (2), the difference (=|Gy−Vso·Yr|) between the lateral acceleration (detected value) Gy and the above-described estimated lateral acceleration (Vso·Yr), or the difference (=|Gy−Vso·Yrt|) between the lateral acceleration (detected value) Gy and the above-described estimated lateral acceleration value (Vso·Yrt).

Further, in the above-described embodiment, the road-surface frictional coefficient μ, obtained from road-surface frictional coefficient information acquired via the road-to-vehicle communications, is used as the road-surface frictional coefficient which is "a factor influencing the easiness of occurrence of a locking tendency of the driven wheels." However, there may be used the road-surface frictional coefficient determined through image-processing of an image of a road surface obtained by a photographing means (CCD camera or the like).

Further, in the above-described embodiment, the road-surface gradient Grad, obtained from the road-surface gradient information acquired via the road-to-vehicle communications, is used as the road-surface gradient which is "a factor influencing the easiness of occurrence of a locking tendency of the driven wheels." However, there may be used a road-surface gradient obtained from road-surface gradient information from GPS. Alternatively, the road-surface gradient may be derived from the fact that road-surface gradient is represented by the difference between the vehicle-body front-rear-direction acceleration detection value obtained from the front-rear acceleration sensor detecting the acceleration in the front-rear direction of the vehicle body, and an estimated vehicle-body front-rear-direction acceleration value obtained through time-differentiation of the estimated vehicle body speed Vso.

Further, in the above-described embodiment, the target braking force distribution is set such that the proportion of the braking force distributed to the front wheels becomes larger as compared with the case where the ideal braking force distribution is employed. However, the target braking force distribution may be rendered coincident with the ideal braking force distribution.

In the above-described embodiment, the present invention is applied to a vehicle having a front-rear piping system. However, the present invention can be applied to a vehicle having a cross piping system.

What is claimed is:

1. A brake control apparatus for a brake apparatus of a vehicle which includes at least a motor as a power source and in which front wheels or rear wheels are driven wheels driven by the motor, and the remaining wheels are non-driven wheels not driven by the motor, the brake apparatus including first control means for controlling respective frictional braking forces acting on the wheels, independently of a braking operation by a driver; and second control means for controlling regenerative braking force which is generated by the motor and acts on the driven wheels, the brake control apparatus comprising:

determination means for determining a first target braking force, which is a target value of total braking force applied to the vehicle, on the basis of the braking operation;

adjustment means for adjusting the regenerative braking force and the frictional braking forces by the second control means and the first control means such that the total braking force, which is the sum of the frictional braking forces and the regenerative braking force, coincides with the first target braking force and that the regenerative braking force can become greater than a second target braking force, which is a braking force acting on the driven wheels when the first target braking force is distributed between the front and rear wheels in accordance with a predetermined target distribution;

acquisition means for acquiring a factor influencing the easiness of occurrence of a locking tendency of the driven wheels when the driven wheels have no locking tendency;

change means, when the regenerative braking force is adjusted to be greater than the second target braking force, for changing an amount by which the regenerative braking force becomes greater than the second target braking force in accordance with the acquired factor;

the adjustment means uses, as the predetermined target distribution of braking force between the front and rear wheels, a distribution determined such that the proportion of the braking force acting on the front wheels is larger than that in the case of an ideal braking force distribution in which locking tendencies simultaneously occur at all the wheels of the vehicle; and wherein the change means changes the amount so that the amount by which the regenerative braking force becomes greater than the second target braking force decreases as the easiness of occurrence of the locking tendency of the driven wheels increases, by determining the regenerative braking force through multiplying the regenerative braking force by a gain which varies within a range from 0 to 1 and which decreases as the easiness of occurrence of the locking tendency shown by the acquired factor increases.

2. A braking control apparatus according to claim 1 in which the front wheels are the driven wheels and the rear wheels are the non-driven wheels.

3. A brake control apparatus for a brake apparatus of a vehicle which includes at least a motor as a power source and in which front wheels or rear wheels are driven wheels driven by the motor, and the remaining wheels are non-driven wheels not driven by the motor, the brake apparatus including first control means for controlling respective frictional braking forces acting on the wheels, independently of a braking operation by a driver; and second control means for controlling regenerative braking force which is generated by the motor and acts on the driven wheels, the brake control apparatus comprising:

determination means for determining a first target braking force, which is a target value of total braking force applied to the vehicle, on the basis of the braking operation;

limit-regenerative-braking-force acquisition means for acquiring a limit regenerative braking force, which is a upper limit value of the regenerative braking force;

adjustment means for adjusting the regenerative braking force and the frictional braking forces by the second control means and the first control means, the adjustment means being configured such that in a case where the first target braking force is equal to or lower than the limit regenerative braking force, the regenerative braking force is set to the value of the first target braking force, and the frictional braking force acting on the driven wheels and that acting on the non-driven wheels are set to zero;

in a case where the first target braking force is greater than the limit regenerative braking force and a second target braking force, which is a braking force acting on the driven wheels when the first target braking force is distributed between the front and rear wheels in accordance with a predetermined target distribution, is equal to or less than the limit regenerative braking force, the regenerative braking force is set to the value of the limit regenerative braking force, the frictional braking force acting on the non-driven wheels is set to a value obtained by subtracting the limit regenerative braking force from the first target braking force, and the frictional braking force acting on the driven wheels is set to zero; and in a case where the second target braking force is in excess of the limit regenerative braking force, the regenerative braking force is set to the value of the limit regenerative braking force, the frictional braking force acting on the non-driven wheels is set to the value of a third target braking force, which is a braking force acting on the non-driven wheels when the first target braking force is distributed in accordance with the target distribution, and the frictional braking force acting on the driven wheels is set to a value obtained by subtracting the limit regenerative braking force from the second target braking force;

acquisition means for acquiring a factor influencing the easiness of occurrence of a locking tendency of the driven wheels when the driven wheels have no locking tendency;

change means for changing the limit regenerative braking force in accordance with the acquired factor;

the adjustment means uses, as the predetermined target distribution of braking force between the front and rear wheels, a distribution determined such that the proportion of the braking force acting on the front wheels is larger than that in the case of an ideal braking force distribution in which locking tendencies simultaneously occur at all the wheels of the vehicle;

allowable-maximum-regenerative-braking-force determination means for determining an allowable maximum regenerative braking force, which is a maximum value of the regenerative braking force that can be qenerated, on the basis of conditions of the vehicle;

wherein the change means changes the limit regenerative brakinq force in accordance with the acquired factor within a ranqe equal to or less than the allowable maximum regenerative braking force; and wherein the limit regenerative braking force decreases as the easiness of occurrence of the locking tendency of the driven wheels increases, by determining the regenerative braking force through multiplying the allowable maximum regenerative braking force by a gain which varies within a range from 0 to 1 and which decreases as the easiness of occurrence of the locking tendency shown by the acquired factor increases.

4. A braking control apparatus according to claim 3, wherein the acquisition means acquires a lateral acceleration of the vehicle as the factor influencing the easiness of occurrence of a locking tendency of the driven wheels; and the change means determines the limit regenerative braking force such that the larger the acquired lateral acceleration, the smaller the limit regenerative braking force.

5. A braking control apparatus according to claim 3, wherein the acquisition means acquires a vehicle body lateral direction limit index value as the factor influencing the easiness of occurrence of a locking tendency of the driven wheels, the vehicle body lateral direction limit index value representing a degree to which turning conditions of the vehicle approach the limit of the vehicle; and the change means determines the limit regenerative braking force such that the larger the acquired vehicle body lateral direction limit index value, the smaller the limit regenerative braking force.

6. A braking control apparatus according to claim 5, wherein the acquisition means acquires, as the vehicle body lateral direction limit index value, at least one of the difference between an actual steering angle of the steerable wheels of the vehicle and an estimated steering angle of the steerable wheels estimated on the basis of traveling conditions of the vehicle and by making use of a predetermined vehicle model, the difference between an actual yaw rate of the vehicle and an estimated yaw rate of the vehicle estimated on the basis of traveling conditions of the vehicle and by making use of a predetermined vehicle model, and the difference between an actual lateral acceleration of the vehicle and an estimated lateral acceleration of the vehicle estimated on the basis of traveling conditions of the vehicle and by making use of a predetermined vehicle model.

7. A braking control apparatus according to claim 3, wherein
the acquisition means acquires a road surface friction coefficient as the factor influencing the easiness of occurrence of a locking tendency of the driven wheels, the road surface friction coefficient representing a coefficient of friction between a road surface on which the vehicle is traveling and tires of the vehicle; and
the change means determines the limit regenerative braking force such that the smaller the acquired road surface friction coefficient, the smaller the limit regenerative braking force.

8. A braking control apparatus according to claim 3, wherein
the acquisition means acquires a road surface gradient as the factor influencing the easiness of occurrence of a locking tendency of the driven wheels, the road surface gradient representing a gradient of a road surface on which the vehicle is traveling with respect to the front-rear direction of the vehicle body; and
the change means determines the limit regenerative braking force such that the larger the road surface gradient in a direction in which load of the driven wheels decreases, the smaller the limit regenerative braking force.

9. A braking control apparatus according to claim 3 in which the front wheels are the driven wheels and the rear wheels are the non-driven wheels.

10. A brake apparatus for a vehicle which includes at least a motor as a power source and in which front wheels or rear wheels are driven wheels driven by the motor, and the remaining wheels are non-driven wheels not driven by the motor, the brake apparatus comprising:
first control means for controlling respective frictional braking forces acting on the wheels, independently of a braking operation by a driver;
second control means for controlling regenerative braking force which is generated by the motor and acts on the driven wheels;
determination means for determining a first target braking force, which is a target value of total braking force applied to the vehicle, on the basis of the braking operation;
adjustment means for adjusting the regenerative braking force and the frictional braking forces by the second control means and the first control means such that the total braking force, which is the sum of the frictional braking forces and the regenerative braking force, coincides with the first target braking force and that the regenerative braking force can become greater than a second target braking force, which is a braking force acting on the driven wheels when the first target braking force is distributed between the front and rear wheels in accordance with a predetermined target distribution;
acquisition means for acquiring a factor influencing the easiness of occurrence of a locking tendency of the driven wheels when the driven wheels have no locking tendency;
change means for changing an amount by which the regenerative braking force becomes greater than the second target braking force in accordance with the acquired factor;
the adjustment means uses, as the predetermined target distribution of braking force between the front and rear wheels, a distribution determined such that the proportion of the braking force acting on the front wheels is larger than that in the case of an ideal braking force distribution in which locking tendencies simultaneously occur at all the wheels of the vehicle; and
wherein the change means changes the amount so the amount by which the regenerative braking force becomes greater than the second target braking force decreases as the easiness of occurrence of the locking tendency of the driven wheels increases, by determining the regenerative braking force through multiplying the regenerative braking force by a gain which varies within a range from 0 to 1 and which decreases as the easiness of occurrence of the locking tendency shown by the acquired factor increases.

11. A computer readable medium storing a brake control program for a brake apparatus of a vehicle which includes at least a motor as a power source and in which front wheels or rear wheels are driven wheels driven by the motor, and the remaining wheels are non-driven wheels not driven by the motor, the brake apparatus including first control means for controlling respective frictional braking forces acting on the wheels, independently of a braking operation by a driver; and second control means for controlling regenerative braking force which is generated by the motor and acts on the driven wheels, the brake control program enabling a computer to execute a brake control comprising the steps of:
determining a first target braking force, which is a target value of total braking force applied to the vehicle, on the basis of the braking operation;
adjusting the regenerative braking force and the frictional braking forces by the second control means and the first control means such that the total braking force, which is the sum of the frictional braking forces and the regenerative braking force, coincides with the first target braking force and that the regenerative braking force can become greater than a second target braking force, which is a braking force acting on the driven wheels when the first target braking force is distributed between the front and rear wheels in accordance with a predetermined target distribution;
acquiring a factor influencing the easiness of occurrence of a locking tendency of the driven wheels when the driven wheels have no locking tendency;
changing an amount by which the regenerative braking force becomes greater than the second target braking force in accordance with the acquired factor;
using, as the predetermined target distribution of braking force between the front and rear wheels, a distribution determined such that the proportion of the braking force acting on the front wheels is larger than that in the case of an ideal braking force distribution in which locking tendencies simultaneously occur at all the wheels of the vehicle; and
wherein the changing comprises changing the amount so the amount by which the regenerative braking force becomes greater than the second target braking force decreases as the easiness of occurrence of the locking tendency of the driven wheels increases, by determining the regenerative braking force through multiplying the regenerative braking force by a gain which varies within a range from 0 to 1 and which decreases as the easiness of occurrence of the locking tendency shown by the acquired factor increases.

* * * * *